(12) United States Patent
Kim et al.

(10) Patent No.: US 10,372,451 B2
(45) Date of Patent: Aug. 6, 2019

(54) SEQUENCE ALIGNMENT METHOD OF VECTOR PROCESSOR

(71) Applicant: Samsung Electronics Co., Ltd., Suwon-si, Gyeonggi-do (KR)

(72) Inventors: Hyun Pil Kim, Seoul (KR); Hyun Woo Sim, Seoul (KR); Seong Woo Ahn, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 27 days.

(21) Appl. No.: 15/802,844

(22) Filed: Nov. 3, 2017

(65) Prior Publication Data

US 2018/0341487 A1 Nov. 29, 2018

(30) Foreign Application Priority Data

May 25, 2017 (KR) ...................... 10-2017-0064500

(51) Int. Cl.
*G06F 9/30* (2018.01)
*G06F 9/38* (2018.01)

(52) U.S. Cl.
CPC ........ *G06F 9/30036* (2013.01); *G06F 9/3001* (2013.01); *G06F 9/30021* (2013.01); *G06F 9/3816* (2013.01); *G06F 9/3887* (2013.01)

(58) Field of Classification Search
None
See application file for complete search history.

(56) References Cited

U.S. PATENT DOCUMENTS

| 8,146,067 | B2 | 3/2012 | Eichenberger et al. |
| 9,405,538 | B2 | 8/2016 | Ioffe et al. |
| 2007/0011441 | A1* | 1/2007 | Eichenberger ...... G06F 9/30032 712/221 |
| 2010/0095087 | A1* | 4/2010 | Eichenberger ...... G06F 9/30025 712/4 |
| 2015/0127924 | A1 | 5/2015 | Prasad et al. |

(Continued)

FOREIGN PATENT DOCUMENTS

| JP | 2001/014139 A | 1/2001 |
| JP | 5445469 B2 | 3/2014 |
| JP | 2016/091488 A | 5/2016 |

(Continued)

*Primary Examiner* — William B Partridge
(74) *Attorney, Agent, or Firm* — Harness, Dickey & Pierce, P.L.C.

(57) ABSTRACT

A sequence alignment method that may be performed by a vector processor is may include loading a sequence that is an instance of vector data including a plurality of elements, dividing the sequence into two groups, aligning respective elements of the groups to generate a sequence of sorted elements according to a single instruction multiple data mode, and iteratively performing an alignment operation based on a determination that each group in the sequence of sorted elements includes more than one element of the plurality of elements. Each iteration may include dividing each group to form new groups and aligning respective elements of each pair of adjacent new groups to generate a new sequence of sorted elements. The new sequence of a current iteration of the alignment operation may be transmitted as a data output, based on a determination that each new group does not include more than one element.

10 Claims, 17 Drawing Sheets

(56) References Cited

U.S. PATENT DOCUMENTS

2015/0310053 A1  10/2015 Kim
2016/0342418 A1  11/2016 Ioffe et al.

FOREIGN PATENT DOCUMENTS

| KR | 2014/0092135 A | 7/2014 |
|---|---|---|
| KR | 101573618 B1 | 12/2015 |
| KR | 101662769 B1 | 10/2016 |
| KR | 101703797 B1 | 2/2017 |

* cited by examiner

FIG. 10

| Command Statement | operand1 | operand2 | operand3 | Explanation |
|---|---|---|---|---|
| t=vminmax08(r,s) #r | t=VR | s=VR | #r=VC | 8bit minmax operation, (0:min, 1:max) |
| t=vminmax16(r,s) #r | t=VR | s=VR | #r=VC | 16bit minmax operation, (0:min, 1:max) |
| t=vminmax32(r,s) #r | t=VR | s=VR | #r=VC | 32bit minmax operation, (0:min, 1:max) |
| t=vpmt(r,s) | t=VR | s=VR | | 128:1 full case permutation |
| t=vcand(r,s) | t=VC | s=VC | | VC and operation |
| t=vcor(r,s) | t=VC | s=VC | | VC or operation |
| t=vcxor(r,s) | t=VC | s=VC | | VC xor operation |
| t=~r | t=VC | s=VC | | VC negation operation |
| t=r | t=VC | s=VC | | VC move operation |
| ld t, M[a] | t=VC | a=R | | direct address |
| ld t, M[a] | t=VC | a=R+PC | | PC-relative addrssing |
| ld t, M[a,i] | t=VC | a=R+i | i=5bit | immediate offset addressing |
| ld t, M[(a),i] | t=VC | a=R | i=5bit | a=a+i, post increment addressing with immediate offset |
| ld t, M[(a),m] | t=VC | a=R | m=R | a=R+m (from R) post increment addressing with register offset |

SEQUENCE ALIGNMENT METHOD OF VECTOR PROCESSOR

This application claims priority to Korean Patent Application No. 10-2017-0064502, filed on May 25, 2017 and all the benefits accruing therefrom under 35 U.S.C. § 119, the disclosure of which is incorporated herein by reference in its entirety.

BACKGROUND

1. Field

The present disclosure relates generally to improving computer processor performance and more particularly to a sequence alignment method of a vector processor.

2. Description of the Related Art

The alignment of a sequence (e.g., the sorting of the elements of the sequence) in descending-order or ascending-order is a basic function used in many systems. Performing alignment via a "fast sort" sorting algorithm with a complexity of O(nlog (n)) such as quick sort includes manipulating individual elements and is thus difficult to apply to (e.g., implement by) vector processors using a single instruction multiple data (SIMD) or single instruction multiple thread (SIMT) architecture.

Thus, most computing systems that include one or more vector processors and/or one or more multicores may use "merge sort" sorting algorithms to implement alignment of a sequence ("sequence alignment"). Since merge sort is relatively fast and efficient for data that is already sorted, computing systems that use merge sort may be required to quickly sort grouped elements before merging them. In general, the complexity of merge sort using a binary tree structure, i.e., O(Nlog$_2$N), is proportional to the size of a data set, i.e., N.

FIG. 1 is a view for explaining a typical merge sort method that may be performed by a computing system that includes one or more vector processors and/or one or more multicores. FIG. 1 illustrates a method of sorting ("aligning") a sequence of eight elements (N=8) in ascending order.

Referring to FIG. 1, the typical merge sort method divides a sequence into N elements first. A conventional scalar processor may be required to perform a separate division process in relation to the merge sort method, but a vector processor does not necessarily need to perform such a division process because in a vector processor, elements of a sequence are connected by a vector structure. Accordingly, a division process may be completed, by a vector processor, simply by loading a sequence of N elements.

Thereafter, each pair of adjacent elements in the sequence, among the N elements divided from the sequence, are sorted ("aligned"). This step is referred to as a merge step, particularly, a "conquer" step of a merge step. For example, as shown in FIG. 1, adjacent elements "8" and "3" may be sorted as "38" because 3 is smaller than 8, and adjacent elements "2" and "9" may be sorted as "29" because 2 is smaller than 9. Since each of the N elements of the sequence needs to be put into a buffer and called, N calls can be achieved. That is, the complexity of the sorting may be a maximum of O(N).

Thereafter, each pair of adjacent sorted subsequences in the sequence may be combined. This step may also be a part of the merge step. For example, a pair of adjacent subsequences "38" and "29" may be combined as "2389", and a pair of adjacent subsequences "17" and "45" may be combined as "1457".

The combining of the subsequences "38" and "29" involves comparing 3 with each of "2" and "9" and comparing "8" with "9" and thus requires three calls. The combination of the subsequences "17" and "45" involves comparing "1" with each of "4" and "5" and comparing "7" with each of "4" and "5" and thus requires four calls. That is, since in a worst-case scenario, the comparison of each pair of adjacent subsequences requires a maximum of four calls and a maximum of eight calls in total. That is, the complexity of the combining may become O(N).

Finally, in order to combine "2839" and "1457", "2" may be compared with each of "1", "4", "5", and "7", "3" may be compared with each of "4", "5", and "7", and "8" may be compared with each of "4", "5", and "7", but not necessarily with "9". If the sequence is varied, a maximum of N comparisons may be needed. Even in which case, the complexity may still be O(N). Accordingly, a maximum of N calls are needed in each step of the typical merge sort method, and the complexity in each step of the typical merge sort method may be O(N).

The division of a sequence with N elements into two halves may be performed log$_2$(N) times to obtain N subsequences, each subsequence containing one element, and the combining of N subsequences may be performed log$_2$(N) times to obtain a whole aligned sequence. Thus, in a worst-case scenario, N*log$_2$(N) calls are needed, which means that the total complexity of the merge sort method, including the merge sort method shown in FIG. 1, may become O(N*log$_2$(N)). Such complexity of an alignment method performed by a vector processor may represent a suboptimal usage of resources (e.g., processing capacity, memory capacity, power supply, etc.) and a suboptimal operating speed of a computing system that includes the vector processor. Accordingly, operating efficiency ("computer performance") of the computing system using the merge sort method may be at a suboptimal state.

SUMMARY

Example embodiments of the present disclosure provide a sequence alignment method of a vector processor, which can improve efficiency of a computing system by reducing operation speed and resource usage.

However, example embodiments of the present disclosure are not restricted to those set forth herein. The above and other example embodiments of the present disclosure will become more apparent to one of ordinary skill in the art to which the present disclosure pertains by referencing the detailed description of the present disclosure given below.

According to some example embodiments, a sequence alignment method of a vector processor may include loading a sequence, the sequence being an instance of vector data, the instance of vector data including a plurality of elements; dividing the sequence into two groups such that each group includes a separate set of i elements of the plurality of elements, i being a natural number; aligning respective i-th elements of the groups in the sequence on an element-by-element basis to generate a sequence of sorted elements according to a single instruction multiple data (SIMD) mode; and iteratively performing an alignment operation based on a determination that each group in the sequence of sorted elements includes more than one element of the plurality of elements. Each iteration of the alignment operation may include dividing each group into two halves to form two new groups, each new group including a separate set of j elements of the i elements of the divided group, j being a natural number; aligning respective j-th elements of each pair of adjacent new groups in the sequence of sorted elements on an element-by-element basis to generate a new sequence of sorted elements, and initiating a new iteration of the alignment operation with the new groups and the new sequence of sorted elements, based on a determination that j>1. The method may further include transmitting the new sequence of a current iteration of the alignment operation as a data output, based on a determination in the current iteration that j=1.

According to some example embodiments, a sequence alignment method of a vector processor may include loading a sequence, the sequence being an instance of vector data, the instance of vector data including N elements, wherein $N=2^n$, n being a natural number; and dividing the sequence into a set of groups, each group including $N/(2^n)$ elements, and aligning respective i-th elements of each pair of adjacent groups to generate a new sequence of sorted elements according to a single instruction multiple data (SIMD) mode, wherein i is a natural number smaller than $N/(2^n)$. The dividing and aligning may include generating a copy sequence in a different order from the sequence by using a permutation operation, and performing "minmax" operations on the sequence and the copy sequence. The method may further include transmitting the new sequence of sorted elements as output data.

According to some example embodiments, a sequence alignment method of a vector processor configured to implement a plurality of slots, each slot including a separate set of functional units, the vector processor further configured to execute a register shared by the plurality of slots, may include loading a sequence, which is an instance of vector data, the instance of vector data having N elements, $N=2^n$, n being a natural number; and causing the plurality of slots to perform, in parallel, dividing the sequence into a set of groups, each group of the set of groups including $N/(2^n)$ elements, and aligning respective i-th elements of each pair of adjacent groups of the set of groups to generate a new sequence of sorted elements according to a single instruction multiple data (SIMD) mode, i being a natural number smaller than $N/(2^n)$. The method may further include transmitting the new sequence of sorted elements as output data.

Other features and example embodiments may be apparent from the following detailed description, the drawings, and the claims.

BRIEF DESCRIPTION OF THE DRAWINGS

The above and other example embodiments and features of the present disclosure will become more apparent by describing in detail example embodiments thereof with reference to the attached drawings, in which:

FIG. 10 is a table showing a set of instructions for realizing a sequence alignment method of a vector processor according to some example embodiments of the present disclosure.

DETAILED DESCRIPTION

In some example embodiments, a computing system that includes a vector processor configured to implement a sequence alignment method with a lower complexity than the typical merge sort method may be configured to perform at least sequence alignment with improved operation speed and reduced usage of computing resources (e.g., a memory), such that the computing system achieved improved operational efficiency (e.g., improved computer performance) in relation to a computing system that includes a vector processor configured to use a merge sort method. The aforementioned sequence alignment method that the computing system may be configured to implement may be referred to herein as a "sequence alignment method of a vector processor."

A sequence alignment method of a vector processor according to some example embodiments of the present disclosure will hereinafter be described with reference to FIGS. 2 and 3A through 3D.

Figure 1:
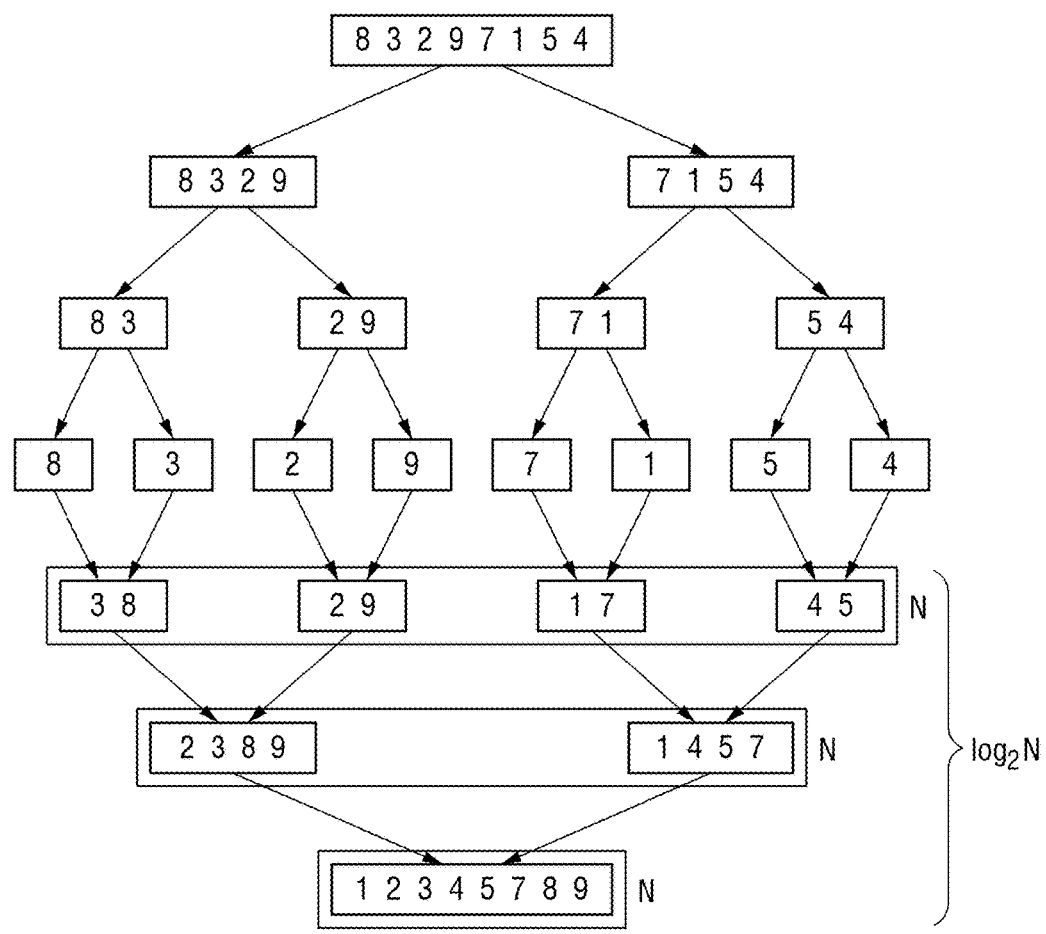
FIG. 1 is a view illustrating a typical merge sort method.
Figure 2:
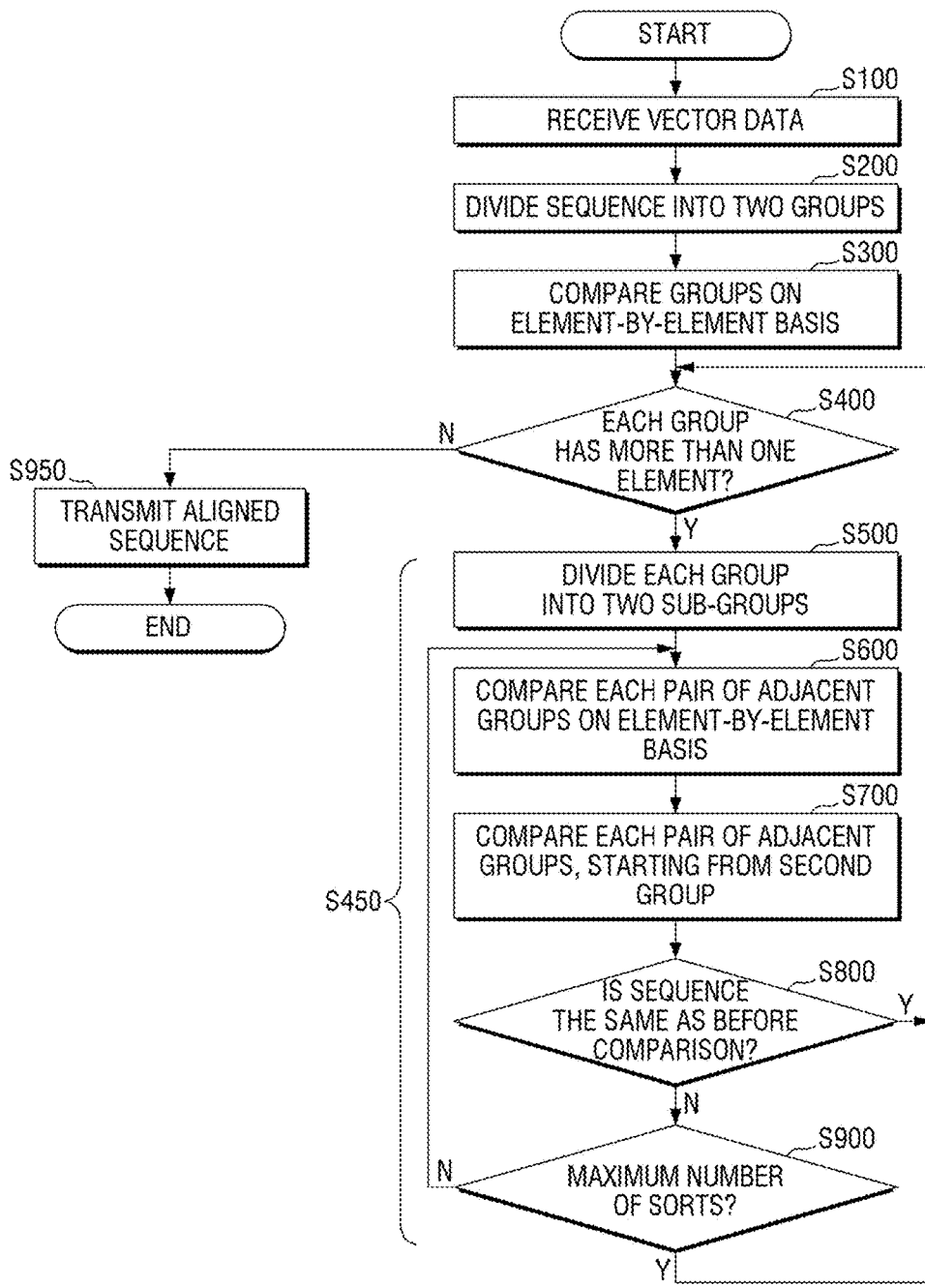
FIG. 2 is a flowchart illustrating a sequence alignment method of a vector processor according to some example embodiments of the present disclosure.

FIG. 2 is a flowchart illustrating a sequence alignment method of a vector processor according to some example embodiments of the present disclosure, and FIGS. 3A through 3D are views illustrating the sequence alignment method of a vector processor according to the example embodiment of FIG. 2. FIGS. 3A through 3D illustrate a method of sorting a sequence having sixteen elements, but the present disclosure is not limited thereto. The methods as illustrated in FIG. 2 and FIGS. 3A through 3D may be implemented by a computing system that includes a vector processor, including the computing system illustrated in at least FIG. 4 below.

Referring to FIG. 2, vector data is input (S100). Such input vector data, also referred to herein as an "instance of vector data," may be input based on the vector data being received at a computing system from a remote device via a communication interface, the vector data being loaded from a memory of the computing system, some combination thereof, or the like.

The instance of vector data may be an unsorted sequence of elements. The sequence ("instance of vector data") may include a total of N elements. N may be $2^n$ (where n is a natural number), but the present disclosure is not limited thereto. In some example embodiments, based on a determination that N is not $2^n$, the inputting at S100 may include adding a dummy element to the sequence so that N may become $2^n$. The N elements may be computed in different single instruction multiple data (SIMD) lanes of the vector processor of the computing system. Accordingly, the number of SIMD lanes of the sequence may be N or greater.

Figure 3A:
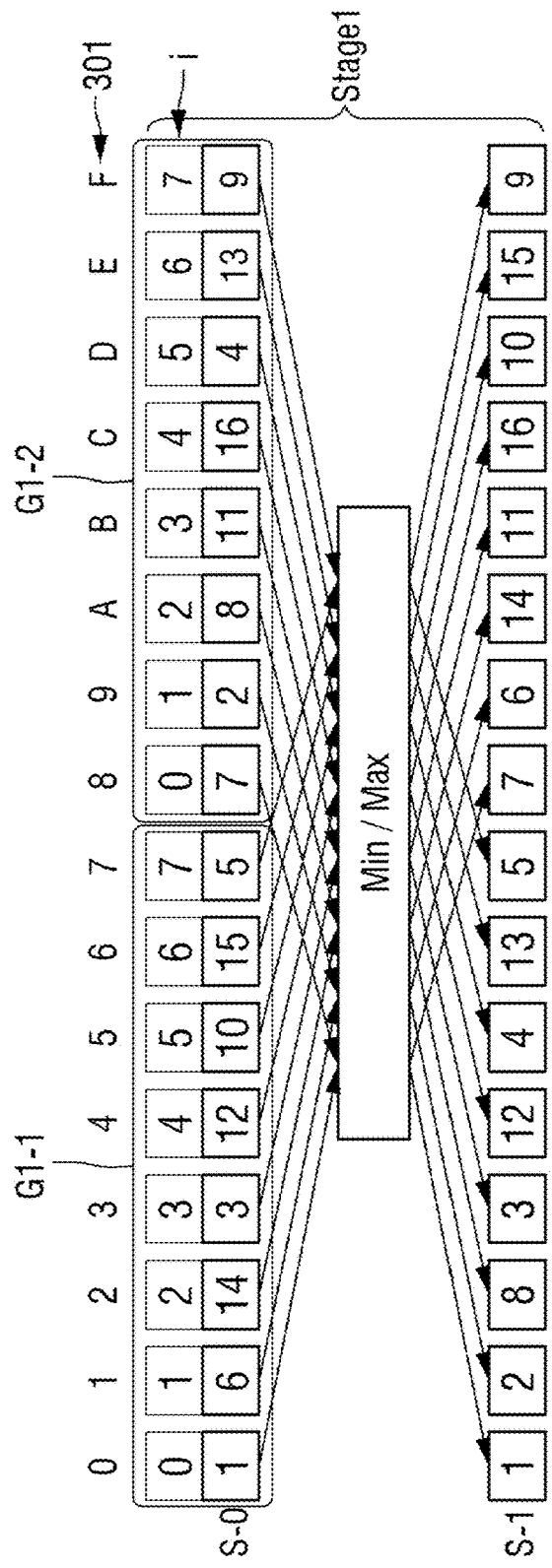
FIG. 3A, FIG. 3B, FIG. 3C, and FIG. 3D are views illustrating the sequence alignment method according to the example embodiment of FIG. 2.

Specifically, referring to FIG. 3A, a sequence S-0 having a total of sixteen elements, the ordered reference labels of the elements ranging from "0" to "F" as shown in FIG. 3A, may be input ("loaded"), but the present disclosure is not limited thereto. That is, the number of elements of the input sequence is not particularly limited. The input sequence may be a sequence that is newly input or a sequence loaded later from a memory. FIG. 3A shows how to align a sequence S-0 that includes a sequence of sixteen elements [1, 6, 14, 3, 12, 10, 15, 5, 7, 2, 8, 11, 16, 4, 13, 9].

Referring again to FIG. 2, the input sequence is divided into a set of groups, where the set of groups may be two groups (S200).

Specifically, referring to FIG. 3A, in a first stage "Stage1", the input sequence S-0, i.e., [1, 6, 14, 3, 12, 10, 15, 5, 7, 2, 8, 11, 16, 4, 13, 9], may be divided into "1-1" and "1-2" groups G1-1 and G1-2.

The "1-1" and "1-2" groups G1-1 and G1-2 may be obtained by dividing the input sequence in two halves. Accordingly, each of the "1-1" and "1-2" groups G1-1 and G1-2 may each have a common quantity of i elements. As shown in FIG. 3A, based on the input sequence being divided in two halves to form Groups G1-1 and G1-2, the common quantity "i" elements may be N/2 elements, i.e., eight elements. In some example embodiments, "i" may be smaller than N/($2^n$).

Each of the "1-1" and "1-2" groups G1-1 and G1-2 may have zeroth through seventh elements (e.g., $0 \leq i \leq 7$). The zeroth through seventh elements of the "1-1" group G1-1 may be compared and sorted later with the zeroth through seventh elements, respectively, of the "1-2" group G1-2. Restated, the respective i-th elements of groups G1-1 and G1-2 in the sequence may be aligned on an element-by-element basis to generate a sequence of sorted elements ("S-1").

Referring again to FIG. 2, the groups are compared with each other on an element-by-element basis (S300), such that respective i-th elements of the set of groups in the sequence S-0 are aligned on an element-by-element basis to generate a sequence of sorted elements (S-1). The alignment may be performed according to a single instruction multiple data (SIMD) mode.

Specifically, referring to FIG. 3A, the "1-1" and "1-2" groups G1-1 and G1-2 may be compared with each other. The comparison of the "1-1" and "1-2" groups G1-1 and G1-2 may be the comparison of the elements of the "1-1" group G1-1 and the elements of the "1-2" group G1-2. That is, the zeroth through seventh elements of the "1-1" group G1-1 may be compared and sorted ("aligned") with the zeroth through seventh elements, respectively, of the "1-2" group G1-2.

For example, the zeroth element of the "1-1" group G1-1, i.e., "1", is compared with the zeroth element of the "1-2" group G1-2, i.e., "7". Since 1 is smaller than 7, the zeroth elements of the "1-1" and "1-2" groups G1-1 and G1-2 maintain their positions in the sequence of sorted elements S-1, relative to their positions in the input sequence S-0. The "position" of an element in a sequence may be understood to be the position 301 in the sequence as defined by the corresponding reference label associated with the respective position in the sequence. Thus, for example as shown in FIG. 3A, the zeroth elements of the "1-1" and "1-2" groups G1-1 and G1-2 maintain their positions at positions 1 and 8 of the sequence S-1, respectively.

On the other hand, since the first element of the "1-1" group G1-1, i.e., "6", is greater than the first element of the "1-2" group G1-2, i.e., "2", the first elements of the "1-1" and "1-2" groups G1-1 and G1-2 switch their positions. As a result, "2" may belong to the "1-1" group G1-1, and "6" may belong to the "1-2" group G1-2.

In this manner, as a result of the first stage "Stage1", the input sequence may be aligned to generate a sequence of sorted elements S-1 [1, 2, 8, 3, 12, 4, 13, 5, 7, 6, 14, 11, 16, 10, 15, 9].

Referring again to FIG. 2, a determination is made as to whether each of the groups has ("includes") more than one element (S400), and an alignment operation (S450=S500-S900) may be iteratively performed, as shown in FIG. 2, based on the determination that each group in the sequence of sorted elements includes more than one element of the plurality of elements (S400=Y). Restated, a new iteration of the alignment operation (S450) with the new groups and the new sequence of sorted elements may be initiated based on a determination that a quantity of sortings of the respective j-th elements of each pair of adjacent new groups in the new sequence of sorted elements on the element-by-element basis is equal to a value of at least 2 m, wherein a quantity of the new groups is equal to $2^{2m}$.

S400 is a determining step for continuously (e.g., iteratively) dividing the input sequence (e.g., the current sequence at S400) into smaller groups until the groups each contain ("include") only one element. If each of the groups contains only one element (i.e., each group does not include more than one element) (S400=N), the input sequence cannot be further divided, and thus, the division of the input sequence may be terminated.

Referring to FIG. 3A, since each of the groups G1-1 and G1-2 contains eight elements, which are more than one element, the division of the input sequence is not terminated (S400=Y).

Referring again to FIG. 2, in a given iteration of the alignment operation (S450), each of the groups is divided into two sub-groups (S500). As referred to herein, a given sub-group generated at (S500) in a given iteration of the alignment operation (S450) may be referred to as a "new group" in relation to the group that is divided at (S500), such that (S500) includes dividing each group into two halves to form two new groups, each new group including a separate set of j elements of the i elements of the divided group, j being a natural number.

Figure 3B:
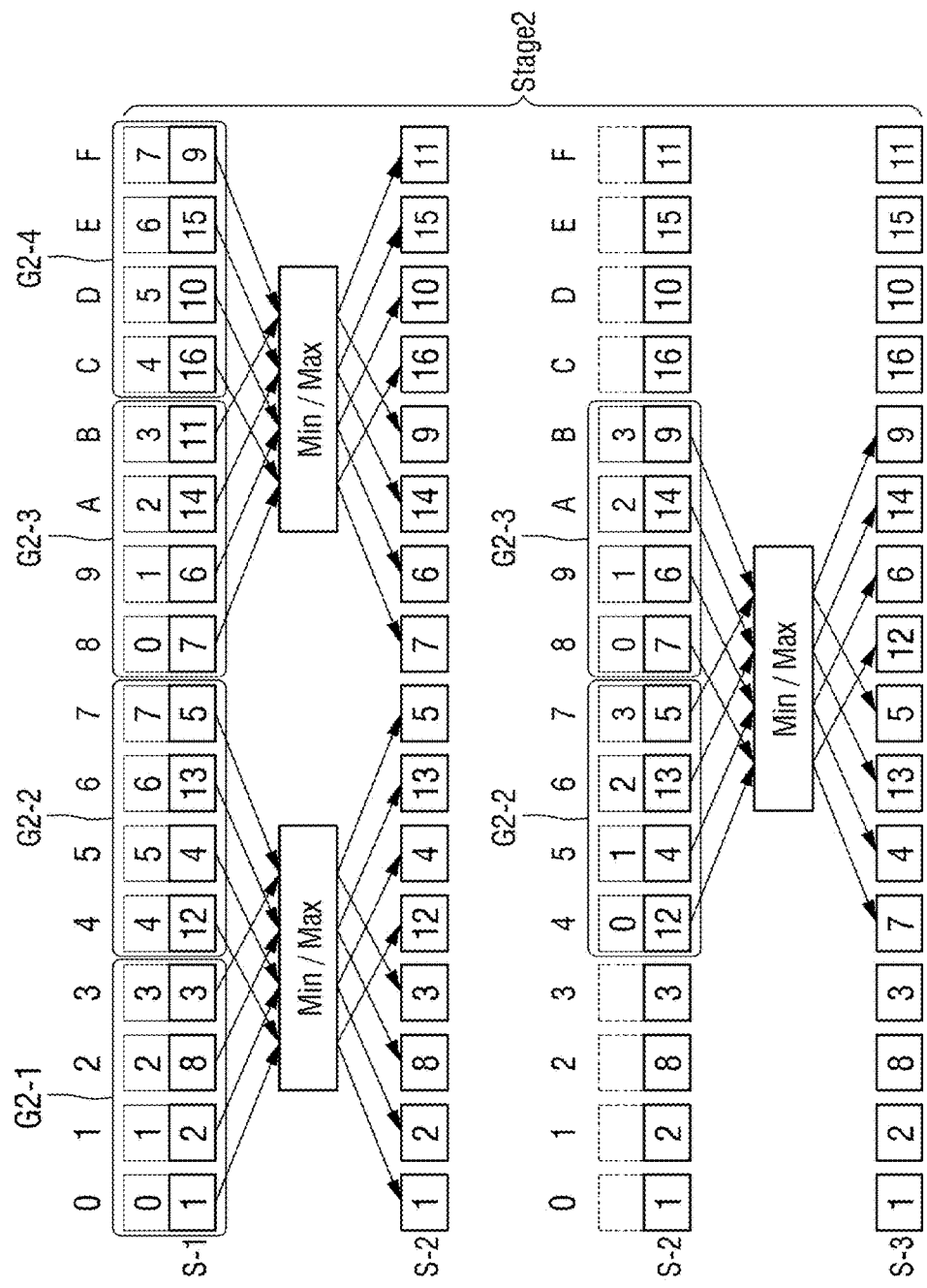

Specifically, referring to FIG. 3B, the "1-1" group G1-1 may be divided into "2-1" and "2-2" groups G2-1 and G2-2, and the "1-2" group G1-2 may be divided into "2-3" and "2-4" groups G2-3 and G2-4.

Each of the "2-1", "2-2", "2-3", and "2-4" groups G2-1, G2-2, G2-3, and G2-4 may contain half the number of elements of each of the "1-1" and "1-2" groups G1-1 and G-2, i.e., four elements. Restated, the common quantity "j" of elements in each new group may be i/2. In a second stage "Stage2", the elements of each of the "2-1", "2-2", "2-3", and "2-4" groups G2-1, G2-2, G2-3, and G2-4 may be sorted ("aligned"). Each of the "2-1", "2-2", "2-3", and "2-4" groups G2-1, G2-2, G2-3, and G2-4 may include four elements, i.e., zeroth through third elements (e.g., $0 \leq j \leq 3$).

Referring again to FIG. 2, in a given iteration of the alignment operation (S450), each pair of adjacent sub-groups ("new groups"), starting from the first sub-group, are compared ("compared and sorted," "aligned," etc.) on the element-by-element basis (S600), such that respective j-th elements of each pair of adjacent new groups in the sequence of sorted elements are aligned on the element-by-element basis to generate a new sequence of sorted elements.

Specifically, referring to FIG. 3B, the "2-1" and "2-2" groups G2-1 and G2-2 may be compared with each other, and the "2-3" and "2-4" groups G2-3 and G2-4 may be compared with each other, as part of the alignment at (S600). That is, the zeroth through third elements of the "2-1" group G2-1 may be compared with the zeroth through third elements, respectively, of the "2-2" group G2-2, and the zeroth through third elements of the "2-3" group G2-3 may be compared with the zeroth through third elements, respectively, of the "2-4" group G2-4. The compared elements may be sorted into new or same positions 301 to generate a new sequence of sorted element (S-2), thereby aligning the respective j-th elements of each pair of adjacent new groups in the sequence of sorted elements on an element-by-element basis to generate a new sequence of sorted elements (S-2).

In this manner, the input sequence (S-1) may be aligned to generate a new sequence of sorted elements (S-2) [1, 2, 8, 3, 12, 4, 13, 5, 7, 6, 14, 9, 16, 10, 15, 11].

Referring again to FIG. 2, in a given iteration of the alignment operation (S450), each pair of adjacent sub-groups, starting from the second sub-group, are compared (S700), such that respective j-th elements of each pair of adjacent new groups in the new sequence of sorted elements (S-2), starting with the second new group, are aligned on the element-by-element basis to generate a further new sequence of sorted elements (S-3).

Specifically, referring to FIG. 3B, the first and last sub-groups, i.e., the "2-1" and "2-4" groups G2-1 and G2-4, are excluded, and the "2-2" and "2-3" groups G2-2 and G2-3 are compared ("compared and sorted," "aligned," etc.) on the element-by-element basis.

In this manner, the input sequence (S-2) may be aligned to generate a new sequence of sorted elements (S-3) [1, 2, 8, 3, 12, 4, 13, 5, 7, 6, 14, 9, 16, 10, 15, 11].

As referred to herein, the comparing ("aligning") at S600 may be referred to herein as performing a first alignment operation, performing a first sort operation, some combination thereof, or the like. As referred to herein, the comparing ("aligning") at S700 may be referred to herein as performing a second alignment operation, performing a second sort operation, some combination thereof, or the like.

Referring again to FIG. 2, in a given iteration of the alignment operation (S450), a determination is made as to whether the input sequence (S-3) is the same as before S600 and S700 (S800). Restated, a determination is made regarding whether the further new sequence S-3 is the same as the input sequence (S-1) of the given iteration of the alignment operation (S450).

Figure 3C:
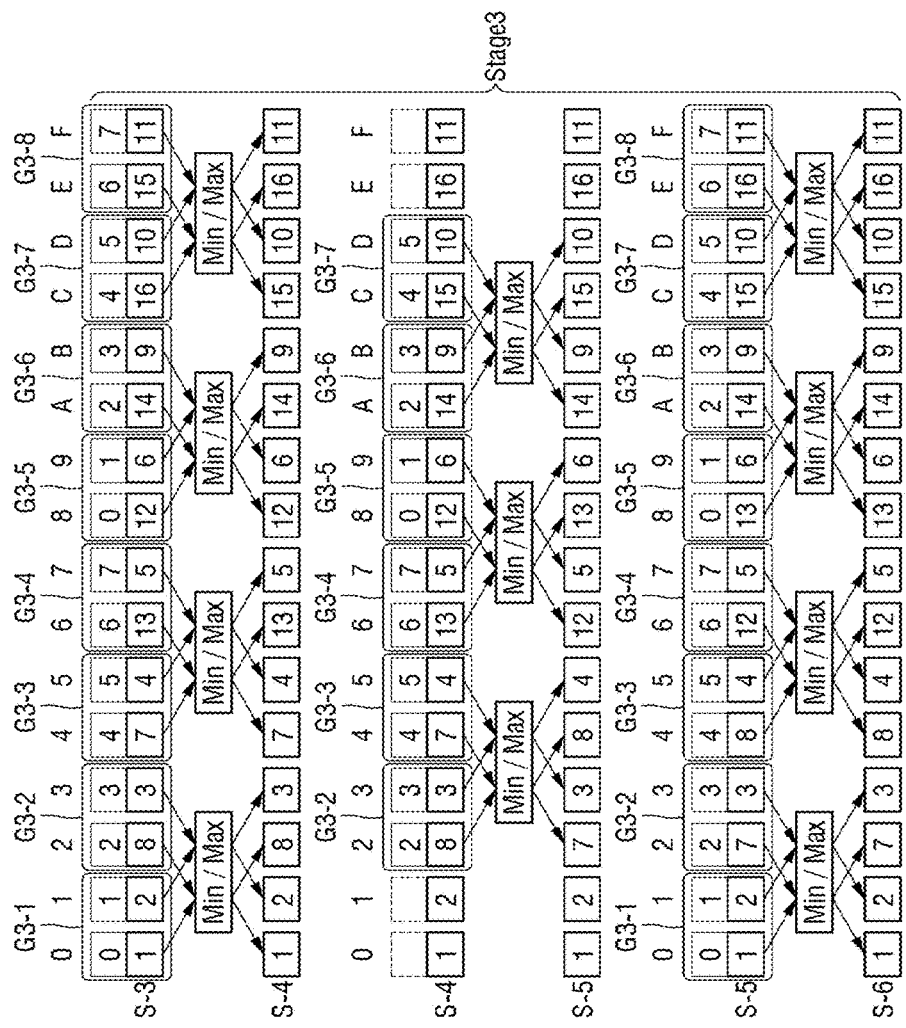

If the input sequence is the same as before S600 and S700 (e.g., S-1=S-3), a current stage ("iteration," "iteration of the alignment operation (S450)," etc.), i.e., the second stage "Stage2", may be completed, and the method may proceed to a new stage, i.e., a third stage "Stage3" of FIG. 3C, further based on a determination that the number of elements in each new group is more than one. Restated, a new iteration of the alignment operation with the new groups G2-1 through G2-4 and the new sequence of sorted elements (S-3), may be initiated based on a determination that j>1 with regard to new groups G2-1 through G2-4 (e.g., S800=Y AND S400=Y). The third stage "Stage3" is a stage for dividing each of the sub-groups obtained in the second stage "Stage2". Restated, a new iteration of the alignment operation (S450) may be initiated with the new groups and the new sequence of sorted elements resulting from the given iteration, such that the new groups and new sequence of the given iteration become the input groups and input sequence of the new iteration.

Specifically, referring to FIG. 3B, since the input sequence (S-3) is no longer the same as before S600 and S700 because of "9" and "11" thereof being sorted (e.g., S-1≠S-3), the method may remain in the second stage "Stage2", instead of proceeding to the third stage "Stage3".

Referring again to FIG. 2, in a given iteration of the alignment operation (S450), a determination is made as to whether a maximum number of sorts ("sortings," "alignments," etc.) associated with the given iteration of the alignment operation (S450) has been reached (S900).

The maximum number of sorts is a value defined for ("associated with") allowing only a particular (or, alternatively, predefined) number ("quantity") of sorts to be performed in each stage ("given iteration") and then proceeding to a subsequent stage ("new iteration") upon the particular number being reached, further based on a determination that the number of elements in each new group is more than one. Restated, a new iteration of the alignment operation with the new groups G2-1 through G2-4 and the new sequence of sorted elements (S-3), may be initiated based on a determination that j>1 with regard to new groups G2-1 through G2-4 (e.g., S900=Y AND S400=Y). Further restated, S600 may include performing a first alignment operation of sorting each pair of adjacent new groups among all of the new groups on the element-by-element basis, S700 may include performing a second alignment operation of sorting each pair of adjacent new groups among all of the new groups except for the first and last new groups on the element-by-element basis, and a given iteration of the alignment operation (S450) may include repeating the first alignment operation (S600) and the second alignment operation (S700) "m" times (e.g., repeat as long as S900=N and until S900=Y). Restated, the first and second alignment operations may be repeated a maximum of (n−1) times.

The maximum number of sorts may differ from one stage to another stage (e.g., each given iteration may be associated with a separate, particular number). For example, the maximum number of sorts for the first stage "Stage1" may be 1, the maximum number of sorts for the second stage "Stage2" may be 2, the maximum number of sorts for the third stage "Stage3" may be 4, and the maximum number of sorts for a fourth stage "Stage4" may be 6. That is, the maximum number of sorts for the first stage "Stage1" may be 1, and the maximum number of sorts for a k-th stage, which is a stage other than the first stage "Stage1", may be $2*(k-1)$.

Since $N=2^n$, a total of $2^k$ groups each having $2^{(n-k)}$ elements may be generated in the k-th stage.

That is, referring to S800 and S900 of FIG. 2, a given iteration of the alignment operation (S450) may include terminating sorting ("alignments") prematurely within the maximum number of sorts ("alignments") associated with the given iteration. That is, the complexity may become $O(2*(\log_2(N)-1))$ in an n-th stage, which is the last stage. The total complexity will be described later.

Specifically, referring to FIG. 3B, since the maximum number of sorts for the second stage "Stage2", i.e., 2, has been reached, sorting is not performed any longer, and the method proceeds to the third stage "Stage3".

Referring again to FIG. 2, a determination is made as to whether each group obtained in the second stage "Stage2" has more than one element (S400), and each group is divided into two sub-groups (S500).

Specifically, referring to FIG. 3C, in a new ("second") iteration of the alignment operation (S450), the "2-1" group G2-1 may be divided into "3-1" and "3-2" groups G3-1 and G3-2, the "2-2" group G2-2 may be divided into "3-3" and "3-4" groups G3-3 and G3-4, the "2-3" group G2-3 may be divided into "3-5" and "3-6" groups G3-5 and G3-6, and the "2-4" group G2-4 may be divided into "3-7" and "3-8" groups G3-7 and G3-8.

Each of the "3-1", "3-2", "3-3", "3-4", "3-5", "3-6", "3-7", and "3-8" groups G3-1, G3-2, G3-3, G3-4, G3-5, G3-6, G3-7, and G3-8 may contain half the number of elements of each of the "2-1", "2-2", "2-3", and "2-4" groups G2-1, G2-2, G2-3, and G2-4, i.e., two elements. In the third stage "Stage3", the elements of each of the "3-1", "3-2", "3-3", "3-4", "3-5", "3-6", "3-7", and "3-8" groups G3-1, G3-2, G3-3, G3-4, G3-5, G3-6, G3-7, and G3-8 may be sorted. Each of the "3-1", "3-2", "3-3", "3-4", "3-5", "3-6", "3-7", and "3-8" groups G3-1, G3-2, G3-3, G3-4, G3-5, G3-6, G3-7, and G3-8 may include two elements, i.e., zeroth and first elements.

Referring again to FIG. 2, in a new ("second") iteration of the alignment operation (S450), each pair of adjacent subgroups, starting from the first sub-group, are compared (aligned) on the element-by-element basis (S600).

Specifically, referring to FIG. 3C, the "3-1" and "3-2" groups G3-1 and G3-2 may be compared with each other, and the "3-3" and "3-4" groups G3-3 and G3-4 may be compared with each other. Also, the "3-5" and "3-6" groups G3-5 and G3-6 may be compared with each other, and the "3-7" and "3-8" groups G3-7 and G3-8 may be compared with each other.

That is, the zeroth and first elements of the "3-1" group G3-1 may be compared with the zeroth and first elements, respectively, of the "3-2" group G3-2, and the zeroth and first elements of the "3-3" group G3-3 may be compared with the zeroth and first elements, respectively, of the "3-4" group G3-4. Also, the zeroth and first elements of the "3-5" group G3-5 may be compared with the zeroth and first elements, respectively, of the "3-6" group G3-6, and the zeroth and first elements of the "3-7" group G3-7 may be compared with the zeroth and first elements, respectively, of the "3-8" group G3-8.

In this manner, the input sequence (S-3) may be aligned to generate a new sequence of sorted elements (S-4) [1, 2, 8, 3, 7, 4, 13, 5, 12, 6, 14, 9, 15, 10, 16, 11].

Referring again to FIG. 2, in a new ("second") iteration of the alignment operation (S450), each pair of adjacent subgroups, starting from the second sub-group, are compared (S700).

Specifically, referring to FIG. 3C, the first and last subgroups, i.e., the "3-1" and "3-8" groups G3-1 and G3-8, are excluded, the "3-2" and "3-3" groups G3-2 and G3-3 may be compared with each other, the "3-4" and "3-5" groups G3-4 and G3-5 may be compared with each other, and the "3-6" and "3-7" groups G3-6 and G3-7 may be compared with each other.

In this manner, the input sequence (S-4) may be aligned to generate a new sequence of sorted elements (S-5) [1, 2, 7, 3, 8, 4, 12, 5, 13, 6, 14, 9, 15, 10, 16, 11].

Referring again to FIGS. 2 and 3C, in a new ("second") iteration of the alignment operation (S450), since the input sequence is not the same as before S600 and S700 (S800=N) and the maximum number of sorts for the third stage "Stage3" has not yet been reached (S900=N), the method returns to S500 in the same ("second") iteration of the alignment operation (S450).

In this manner, the input sequence (S-5) may be aligned to generate a new sequence of sorted elements (S-6) [1, 2, 7, 3, 8, 4, 12, 5, 13, 6, 14, 9, 15, 10, 16, 11].

In the above description, S800 is performed after S600 and S700 in a given iteration, but the present disclosure is not limited thereto. That is, in some example embodiments, S800 may be performed between S600 and S700 or immediately after S700, or may be performed twice, once after S600 and once after S700, in a given iteration of the alignment operation (S450).

Since the input sequence is now the same as before S600 and S700 (S800=Y), the third stage "Stage3" may be completed, and the method proceeds to the fourth stage "Stage4", even though the maximum number of sorts for the third stage "Stage3" has not yet been reached. Restated, a new ("third") iteration of the alignment operation with the new groups G3-1 through G3-8 and the new sequence of sorted elements (S-6), may be initiated based on a determination that j>1 with regard to new groups G3-1 through G3-8 (e.g., S800=Y AND S400=Y)

Referring again to FIG. 2, in response to the determination is made as to whether each group obtained in the third stage "Stage3" has one element (S400=Y), and each group is divided into two sub-groups (S500) in a new ("third") iteration of the alignment operation (S450).

Figure 3D:
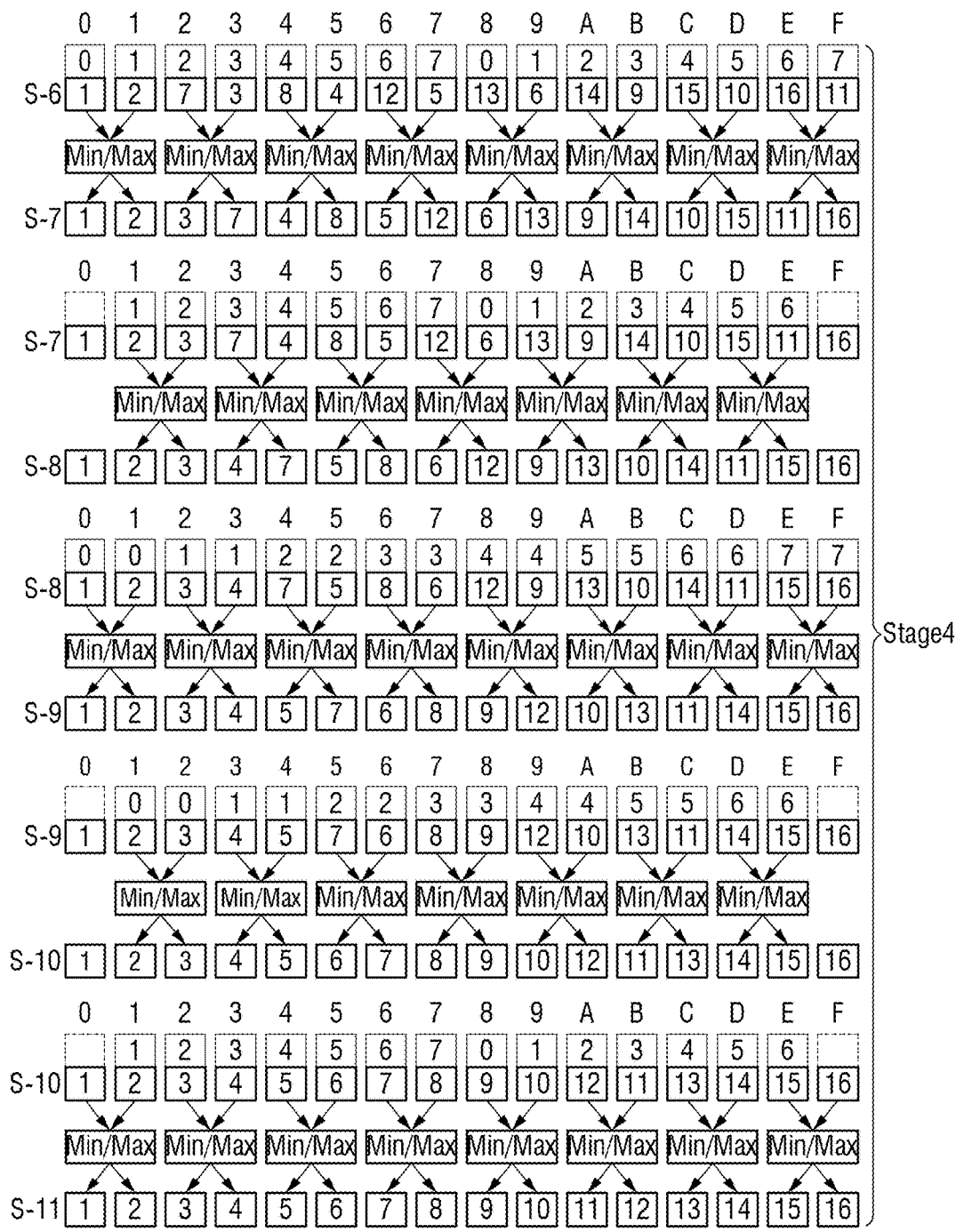

Specifically, referring to FIG. 3D, each group obtained in the third stage "Stage3" may be divided into two sub-groups each having one element.

That is, since each element can form a group, a total of 16 sub-groups each having one element may be obtained in S500 of the fourth stage "Stage4".

Referring again to FIG. 2, in a new ("third") iteration of the alignment operation (S450), each pair of adjacent subgroups, starting from the first sub-group, are compared ("aligned") on the element-by-element basis (S600).

Specifically, referring to FIG. 3D, "1" and "2" are compared, and "7" and "3" are compared. In this manner, each pair of adjacent elements may be compared and sorted.

In this manner, the input sequence (S-6) may be aligned to generate a new sequence of sorted elements (S-7) [1, 2, 3 7, 4, 8, 5 12, 6, 13, 9, 14, 10, 15, 11, 16].

Referring again to FIG. 2, in a new ("third") iteration of the alignment operation (S450), each pair of adjacent subgroups, starting from the second sub-group, compared ("aligned") (S700).

Specifically, referring to FIG. 3D, each pair of adjacent elements except for the first and last elements are compared. For example, "2" and "3" are compared, and "7" and "4" are compared.

In this manner, the input sequence (S-7) may be aligned to generate a new sequence of sorted elements (S-8) [1, 2, 3, 4, 7, 5, 8, 6, 12, 9, 13, 10, 14, 11, 15, 16].

Referring to FIGS. 2 and 3D, in a new ("third") iteration of the alignment operation (S450), since the input sequence is not the same as before S600 and S700 (S800=N) and the maximum number of sorts for the fourth stage "Stage4" has not yet been reached (S900=N), the method returns to S500 in the same ("third") iteration of the alignment operation (S450).

In this manner, the input sequence (S-8) may be aligned to generate a new sequence of sorted elements (S-9) [1, 2, 3, 4, 5, 7, 6, 8, 9, 12, 10, 13, 11, 14, 15, 16].

Referring again to FIG. 2, in a new ("third") iteration of the alignment operation (S450), each pair of adjacent subgroups, starting from the second sub-group, are compared ("aligned") (S700).

Specifically, referring to FIG. 3D, each pair of adjacent elements except for the first and last elements are compared. For example, "2" and "3" are compared, and "4" and "5" are compared.

In this manner, the input sequence (S-9) may be aligned to generate a new sequence of sorted elements (S-10) [1, 2, 3, 4, 5, 6, 7, 8, 9, 10, 12, 11, 13, 14, 15, 16].

Referring to FIGS. 2 and 3D, in a new ("third") iteration of the alignment operation (S450), since the input sequence is still not the same as before S600 and S700 (S800=N) and the maximum number of sorts for the fourth stage "Stage4" still has not yet been reached (S900=N), the method returns to S500 in the same ("third") iteration again.

In this manner, the input sequence (S-10) may be aligned to generate a new sequence of sorted elements (S-11) [1, 2, 3, 4, 5, 6, 7, 8, 9, 10, 11, 12, 13, 14, 15, 16].

Referring again to FIG. 2, in a new ("third") iteration of the alignment operation (S450), each pair of adjacent sub-groups, starting from the second sub-group, are compared ("aligned") (S700).

Specifically, referring to FIG. 3D, each pair of adjacent elements except for the first and last elements are compared. For example, "2" and "3" are compared, and "4" and "5" are compared.

In this manner, the input sequence (S-10) may be aligned to generate a new sequence of sorted elements (S-11) [1, 2, 3, 4, 5, 6, 7, 8, 9, 10, 11, 12, 13, 14, 15, 16].

Referring again to FIG. 2, since the input sequence is now the same as before S600 and S700 (S800=Y) and each sub-group has no more than one element (S400=N), the ne sequence of the current ("third") iteration of the alignment operation (450) may be transmitted as a data output (e.g., based on a determination in the current iteration that j=1) (S950). The transmitting may include saving the data output to a memory of the computing system implementing the method shown in FIG. 2 and FIGS. 3A through 3D, transmitting the data output to a remote device via one or more communication interfaces, providing the data output via one or more display interfaces, some combination thereof, or the like.

Referring to FIGS. 3A through 3D, since $N=2^n$, the number of sorts ("alignments") performed in the k-th stage, which is a stage other than the first stage "Stage1", may be a maximum of $2*(k-1)$, and the maximum number of sorts for the n-th stage may be $2*(\log_2(N)-1)$ because $n=\log_2(N)$. Thus, the dividing of a sequence into a set of groups, (for example, where each group including $N/(2^n)$ elements), and aligning respective i-th elements of each pair of adjacent groups according to a single instruction multiple data (SIMD) mode, wherein i is a natural number (and i may be smaller than $N/(2^n)$), may be repeatedly performed for each case when $n=1, 2, \ldots, \log_2(N)$. In some example embodiments, the repeatedly performing the dividing and the aligning includes performing the dividing and the aligning only once for a case when n=1 (e.g., based on a determination that n=1), and performing the dividing and the aligning $2(n-1)$ times for a case when $n=2, \ldots, \log_2(N)$ (e.g., based on a determination that $n=2, \ldots, \log_2(N)$). Performing the dividing and the aligning $2(n-1)$ times may include performing a first alignment operation (as described above with reference to at least FIG. 2) of aligning each pair of adjacent groups among all groups on the element-by-element basis; performing a second alignment operation (as described above with reference to at least FIG. 2) of aligning each pair of adjacent groups among all the groups except for the first and last groups on the element-by-element basis; and repeating the first and second alignment operations a maximum of (n-1) times.

Therefore, the total number of sorts performed in the second through n-th stages may be expressed as $2+4+6+\ldots+2*(\log_2(N)-1)=[2+2*\{\log_2(N)-1\}]*\{\log_2(N)-1\}/2$.

Since the number of sorts performed in the first stage "Stage1" is 1, the total number of sorts performed in the first through n-th stages may be approximated as follows: $1+2+4+6+\ldots+2*(\log_2(N)-1)=1+[2+2*\{\log_2(N)-1\}]*\{\log_2(N)-1\}/2\approx\{\log_2(N)\}^2$.

Accordingly, the sequence alignment method according to the example embodiment of FIG. 2 may have a complexity of $O(\{\log_2(N)\}^2)$, which is much lower than the complexity of a typical merge sort method, i.e., $O(N*\log_2(N))$. Therefore, a computing system that includes a vector processor configured to perform the sequence alignment method as shown in FIG. 2 may be configured to perform sequence alignment to generate a data output with improved operational efficiency, computer performance, reduced usage of computing resources, improved operational speed, some combination thereof, or the like in relation to a computing system that is configured to perform the typical merge sort method. Therefore, the functioning ("functionality") of the computing system may be improved as a result of including a vector processor configured to perform the sequence alignment method as shown in FIG. 2.

FIGS. 2 and 3A through 3D illustrate sorting ("alignment") as being performed in a top-down manner, but in some example embodiments, sorting may be performed in a bottom-up manner. Even the bottom-up sorting approach may also have a complexity of $O(\{\log_2(N)\}^2)$, which is much lower than the complexity of a typical merge sort method, i.e., $O(N*\log_2(N))$, and as a result, the efficiency of sequence alignment performed by a computing system can be improved, thereby improving the functioning of the computing system.

A computing system that includes a vector processor configured to perform a sequence alignment method of a vector processor according to some example embodiments of the present disclosure will hereinafter be described with reference to FIGS. 4 through 6.

Figure 4:
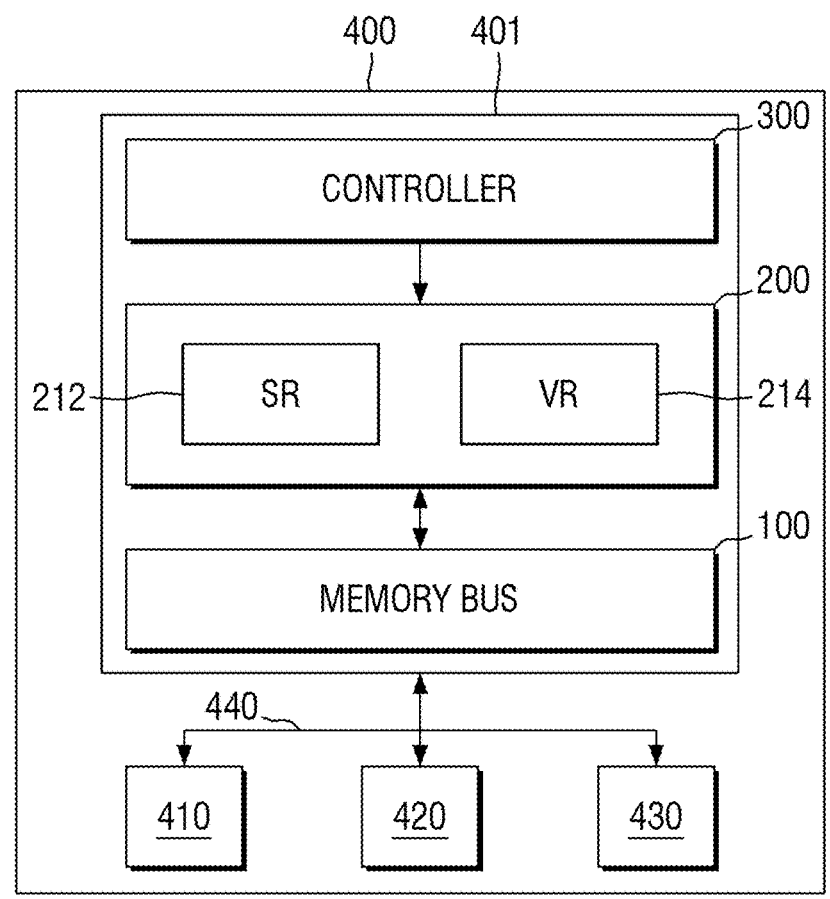
FIG. 4 is a block diagram of a computing system including a vector processor configured to execute a sequence alignment method of a vector processor according to some example embodiments of the present disclosure.
Figure 5:
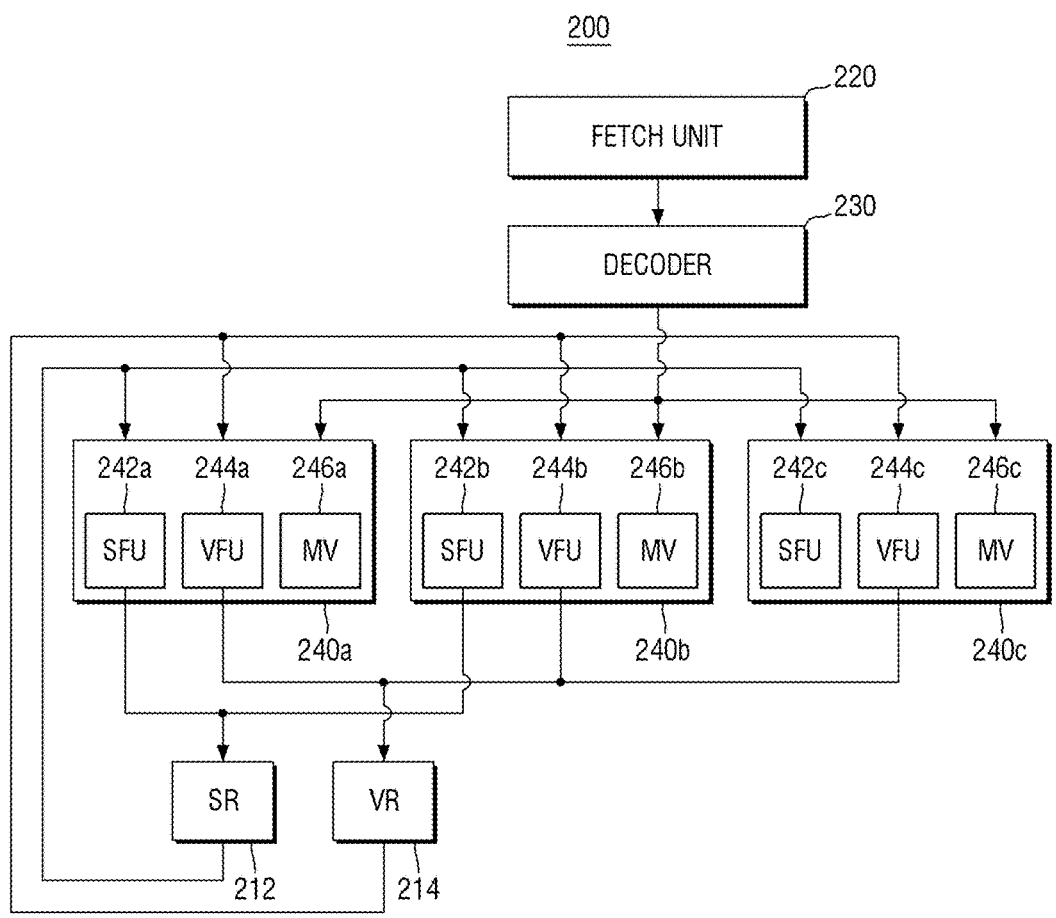
FIG. 5 is a block diagram of a processor illustrated in FIG. 4.
Figure 6:
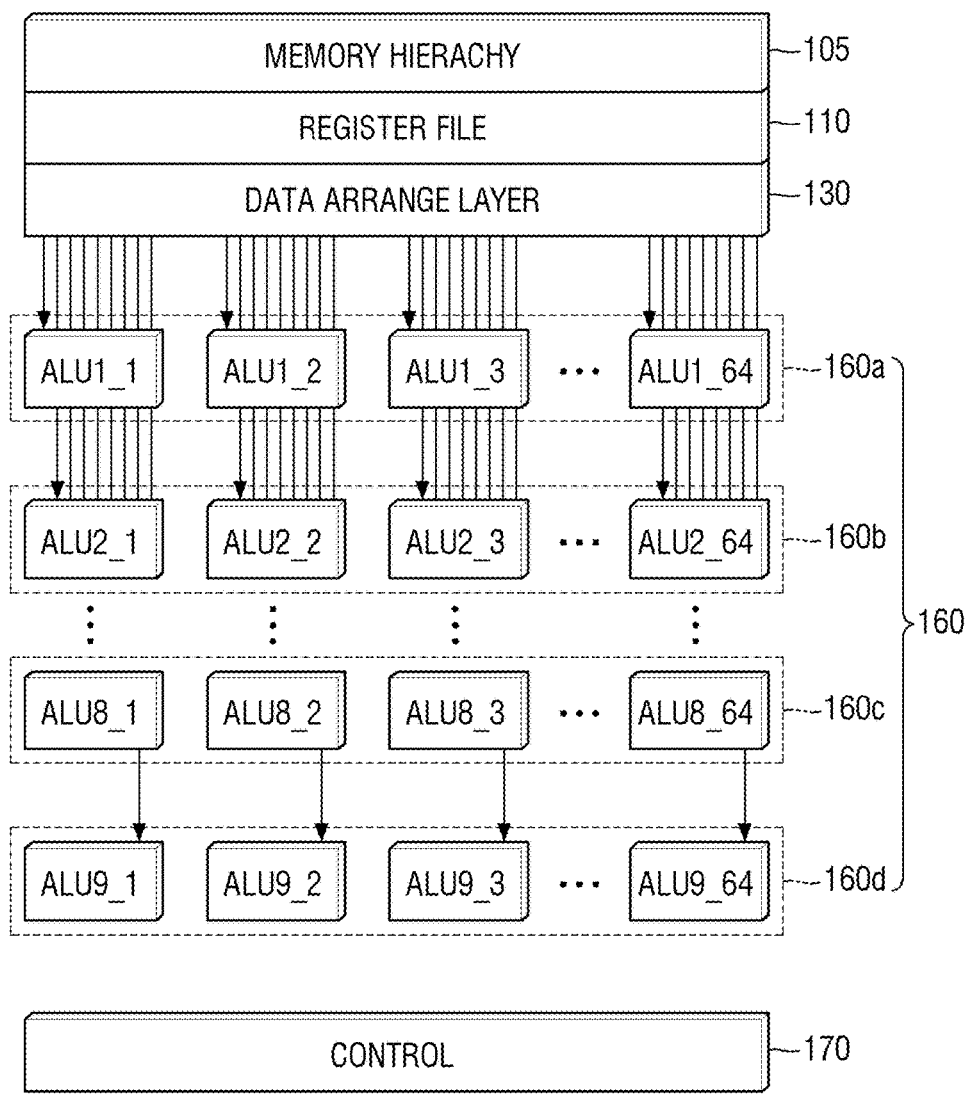
FIG. 6 is a view illustrating a data movement architecture of the vector processor according to the example embodiment of FIG. 4.

FIG. 4 is a block diagram of a computing system 400 including a vector processor according to some example embodiments of the present disclosure, FIG. 5 is a block diagram of a processor illustrated in FIG. 4, and FIG. 6 is a view illustrating a data movement architecture of the vector processor according to the example embodiment of FIG. 4.

Specifically, FIG. 4 illustrates the structure of a computing system 400 including a vector processor configured to execute a sequence alignment method of a vector processor according to some example embodiments of the present disclosure.

Referring to FIG. 4, the computing system 400 includes a vector processor 401 that includes a processor 200, a controller 300, and a memory bus 100. The memory bus 100 may include a memory, memory device, etc. The computing system 400 may further include a power supply 410, a communication interface 420, and/or a display interface 430. The power supply 410, communication interface 420, and/or display interface 430 may be communicatively coupled to one or more elements of the vector processor 401 via a bus 440. The communication interface 420 may include a wired and/or wireless communication interface. For example, the communication interface 420 may include a wireless network communication transceiver. The communication interface 420 may include a wired network communication interface. The communication interface 420 may be configured to establish and/or terminate one or more communication links with one or more remotely-located devices and to send and/or receive data via the one or more communication links.

The processor 200 is a processor that is configured to perform ("implement," "execute," etc.) an arithmetic operation. In some example embodiments, the processor 200 may be configured to implement as a vector processor specialized in processing a vector operation including vector-specific instructions, such as a prediction operation, a vector permute operation, a vector bit manipulation operation, a butterfly operation, or a sorting operation. In some example embodiments, the processor 200 may be configured to employ a SIMD and Very-Long Instruction Word (VLIW) architecture. In some example embodiments, the processor 200 is configured to implement an operation, a method, a functionality, an element, a vector processor, some combination thereof, or the like based on executing one or more programs of instructions stored in a memory, where the memory bus 100 may include the memory. The memory bus 100 may include a non-transitory computer-readable storage medium that stores one or more computer-executable programs of instruction, where such one or more programs may be executable by processor 200 to cause the vector processor 401 to perform one or more operations of one or more methods.

The processor 200 may be configured implement registers (212 and 214) and may perform an arithmetic operation using registers (212 and 214). In some example embodiments, registers (212 and 214) may include at least one of a scalar register (SR) 212 and a vector register (VR) 214.

The SR 212 is a register used in a scalar operation of the processor 200, and the VR 214 is a register used in a vector operation of the processor 200.

Referring to FIG. 5, the processor 200 may be configured to implement a fetch unit 220 and a decoder 230.

The decoder 230 may decode an instruction fetched from the fetch unit 220. In some example embodiments, the fetched instruction may be processed by three slots, i.e., first, second, and third slots 240a, 240b, and 240c using the VLIW architecture. For example, if the fetched instruction is 96 bits long, the decoder 230 may decode the fetched instruction into three 32-bit instructions, and the three 32-bit instructions may be processed by the first, second, and third slots 240a, 240b, and 240c, respectively.

FIG. 5 illustrates an example in which the fetched instruction is decoded into three instructions and the three instructions are processed by three slots, respectively, but the present disclosure is not limited thereto. That is, the processor 200 may be configured such that the fetched instruction may be processed by an arbitrary number of slots, which are two or more slots.

In the example embodiment of FIG. 5, the processor 200 may be configured to implement first, second, and third slots 240a, 240b, and 240c that may all be driven at the same time. In order to effectively perform this type of parallel processing, scalar functional units (SFUs) 242a, 242b, and 242c, vector functional units (VFUs) 244a, 244b, and 244c, and move units (MVs) 246a, 246b, and 246c may be respectively implemented ("included in") in the first, second, and third slots 240a, 240b, and 240c. Thus, the vector processor 401 may be configured to implement a plurality of slots that each includes a separate set of functional units.

Specifically, the first slot 240a may be implemented to include the SFU242a, the VFU 244a, and the MV 246a, the second slot 240b may be implemented to include the SFU242b, the VFU 244b, and the MV 246b, and the third slot 240c may be implemented to include the SFU242c, the VFU 244c, and the MV 246c.

The processor 200 may share data using the MVs 246a, 246b, and 246c included in the first, second, and third slots 240a, 240b, and 240c, respectively.

Data processed by the SFUs 242a, 242b, and 242c may be stored in the SR 212 of FIG. 4, and data processed by the VFUs 244a, 244b, and 244c may be stored in the VR 214 of FIG. 4. The data stored in the SR 212 and the VR 214 may be used by the processor 200, as necessary.

The structure of the processor 200 of FIG. 5 is merely an example, and the present disclosure is not limited thereto.

FIG. 6 illustrates a data movement architecture of the vector processor 401 according to the example embodiment of FIG. 4. As indicated above, the data movement architecture may be implemented based on processor 200 executing a program of instructions stored in memory bus 100.

Referring to FIG. 6, the data movement architecture includes a memory hierarchy 105, a register file 110, a data arrange layer 130, a plurality of arithmetic logic units (ALUs) 160, and a controller 170.

The memory hierarchy 105 provides a memory interface and may correspond to a memory device or the memory bus 100 of FIG. 4.

The register file 110 may correspond to the registers (212 and 214) of FIG. 4, which include the SR 212 and the VR 214.

The data arrange layer 130 may generate a data pattern for efficiently performing an operation on various sizes of data (for example, matrices) to be processed by the processor 200.

The data movement architecture can perform a sophisticated flow control and a complicated arithmetic operation using the registers (212 and 214), which may be shared by the ALUs 160 (e.g., ALUs 160a, ALUs, 160b, ALUs 160c, ALUs 160d, etc.), and at the same time, can improve the reusability of input data by patterning data stored in the registers (212 and 214) using the data arrange layer 130.

By using the vector processor 401 of FIGS. 4 through 6, a sequence alignment method of a vector processor according to some example embodiments of the present disclosure can be efficiently performed. Therefore, a computing system 400 that includes a vector processor 401 may be configured to perform sequence alignment to generate a data output with improved operational efficiency, computer performance, reduced usage of computing resources, improved operational speed, some combination thereof, or the like in relation to a computing system that is configured to perform the typical merge sort method. Therefore, the functioning ("functionality") of the computing system 400 may be improved as a result of including a vector processor 401.

That is, the sequence alignment method described above with reference to FIGS. 3A through 3D can include performing multiple sorting operations in parallel using the VLIW architecture because groups to be sorted have no data dependency therebetween. That is, for example, referring to FIG. 3B, the sorting of the "2-1" and "2-2" groups G2-1 and G2-2 and the sorting of the "2-3" and "2-4" groups G2-3 and G2-4 can be processed by different slots because the "2-1" and "2-2" groups G2-1 and G2-2 and the "2-3" and "2-4" groups G2-3 and G2-4 have no data dependency therebetween.

For example, in some example embodiments, a vector processor 401 may be configured to implement a plurality of slots, each slot including a separate set of functional units, and the vector processor may be further configured to execute a register shared by the plurality of slots. The sequence alignment method may include loading a sequence, which is an instance of vector data, the instance of vector data having N elements, $N=2^n$, n being a natural number, and causing the plurality of slots to perform, in parallel, dividing the sequence into a set of groups and aligning respective i-th elements of each pair of adjacent groups of the set of groups according to a single instruction multiple data (SIMD) mode to generate a new sequence of sorted elements. The new sequence of sorted elements may be transmitted as output data. By generating and outputting the new sequence of sorted elements via the operations provided herein, a computing system that includes a vector processor performing such operations may have improved functioning at least by virtue of improved operational efficiency, computer performance, etc. Each group of the set of groups may include $N/(2^n)$ elements and i may be a natural number smaller than $N/(2^n)$. The dividing may be performed repeatedly for each case when $n=1, 2, \ldots, \log_2(N)$.

In this manner, sequence alignment can be completed at much faster speed and with much higher efficiency, thereby improving the functioning of computing system 400. It will be understood that a computing system may be referred to herein interchangeably as a "computer."

Also, since registers are shared by slots, even sequential operations with a data dependency therebetween can be completed by allowing functional units of different slots to hand over tasks to one another without the need to call a memory. That is, a task can be handed over to, and performed by, a slot that can perform an optimal operation in each step. In this manner, the efficiency of an overall sorting operation can be considerably improved.

The operational aspect of a sequence alignment method of a vector processor according to some example embodiments of the present disclosure will hereinafter be described with reference to FIGS. 3A through 3D, 7, and 8.

Figure 7:
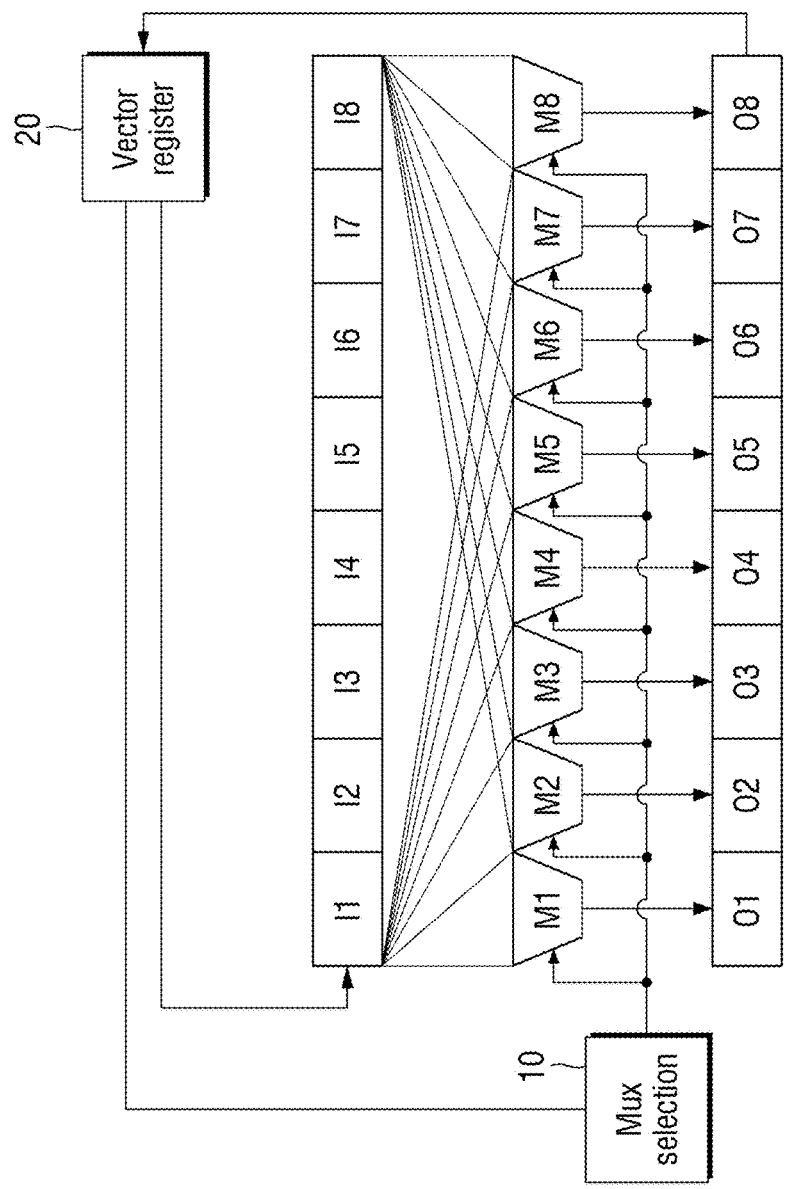
FIG. 7 is a view illustrating a permutation circuit used in a sequence alignment method of a vector processor according to some example embodiments of the present disclosure.
Figure 8:
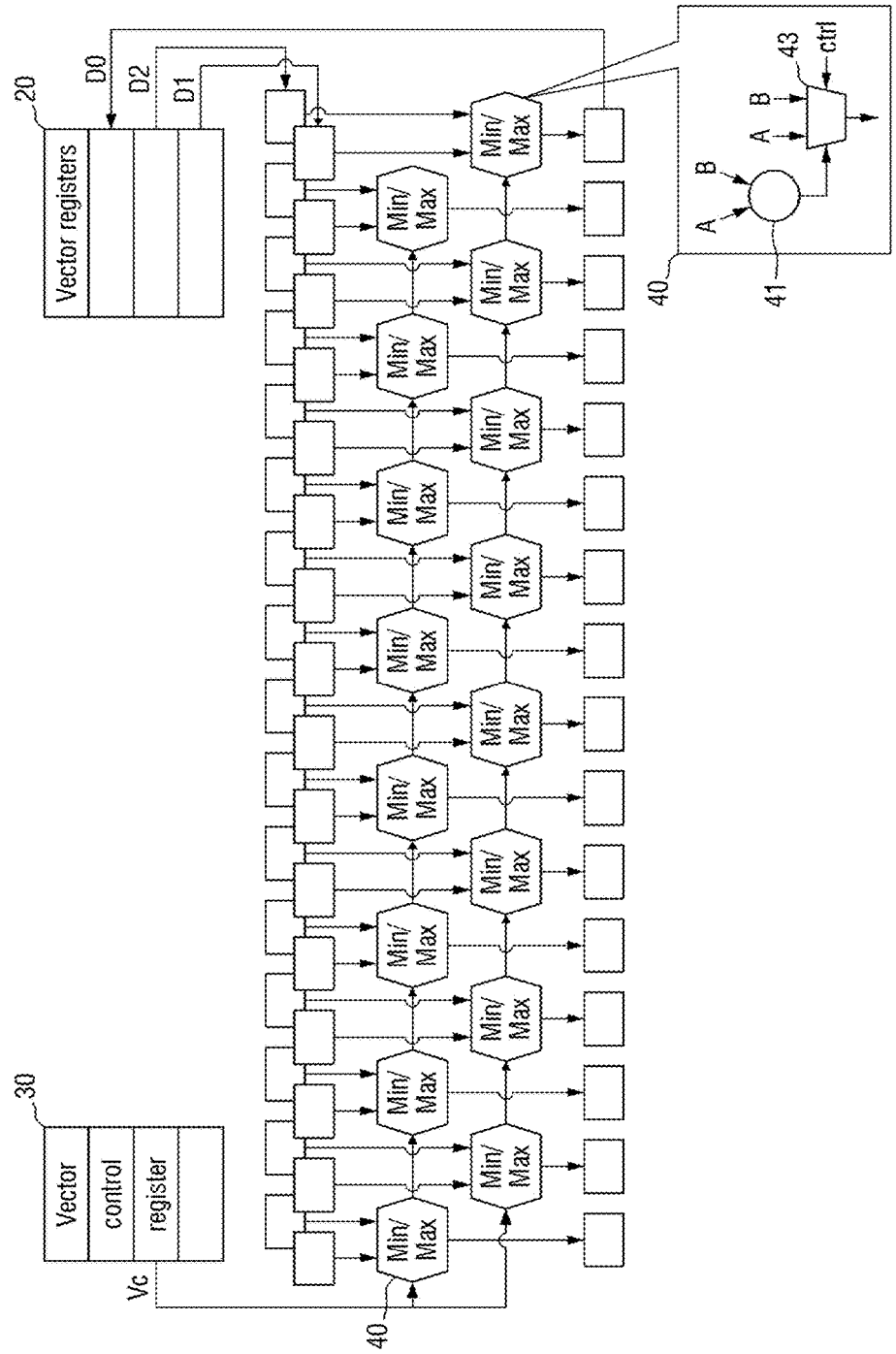
FIG. 8 is a view illustrating a Min/Max circuit used in a sequence alignment method of a vector processor according to some example embodiments of the present disclosure.

FIG. 7 is a view illustrating a permutation circuit used in a sequence alignment method of a vector processor according to some example embodiments of the present disclosure, and FIG. 8 is a view illustrating a Min/Max circuit used in a sequence alignment method of a vector processor according to some example embodiments of the present disclosure.

Referring to FIG. 7, the permutation circuit includes a VR 20, a multiplexer selection signal 10, and first through eighth multiplexers M1 through M8.

The VR 20 may provide input data (I1 through I8), which is input to the permutation circuit, and may store output data (O1 through O8), which is output from the permutation circuit. The VR 20 may correspond to the VR 214 of FIGS. 4 and 5 or the register file 110 of FIG. 6.

The VR 20 may also provide the multiplexer selection signal 10. Accordingly, the first through eighth multiplexers M1 through M8 may change the arrangement of the input data (I1 through I8) in accordance with the multiplexer selection signal 10 and may then output the input data (I1 through I8) as the output data (O1 through O8).

FIG. 7 illustrates an example in which each of the input data (I1 through I8) and the output data (O1 through O8) is vector data having eight elements and eight multiplexers, i.e., the first through eighth multiplexers M1 through M8, are provided, but the present disclosure is not limited thereto. That is, the number of elements of the input data (I1 through I8) or the output data (O1 through O8) and the number of multiplexers provided may vary as necessary.

The input data (I1 through I8 and the output data (O1 through O8) may both be vector data, and the elements of the input data (I1 through I8) and the elements of the output data (O1 through O8) may be processed by different SIMD lanes. In this manner, a vector processor, unlike a scalar processor, can achieve fast operation speed.

The first through eighth multiplexers M1 through M8 may receive all the elements of the input data (I1 through I8) and may output the received elements of the input data (I1 through I8) as the output data (O1 through O8).

FIG. 8 illustrates a Min/Max circuit used in a sequence alignment method of a vector processor according to some example embodiments of the present disclosure.

Referring to FIG. 8, the Min/Max circuit includes a VR 20, a vector control register 30, and Min/Max operators 40.

The VR 20 may provide D1 and D2, which are input to the Min/Max circuit, and may store D0, which is output from the Min/Max circuit. The VR 20 may correspond to the VR 214 of FIGS. 4 and 5 or the register file 110 of FIG. 6.

The vector control register 30 is illustrated in FIG. 8 as being a separate element, but may be incorporated with the VR 20. The vector control register 30 may store a control vector Vc, which is a control signal (e.g., "control signal vector") for the Min/Max operators 40, and may provide the control vector Vc to the Min/Max operators 40.

A plurality of Min/Max operators 40 may be provided. According to a SIMD processing method, if D1, D2, and D0 are each vector data having N elements, N Min/Max operators 40 may be provided. FIG. 8 illustrates an example in which a total of 16 Min/Max operators 40 are provided, but the present disclosure is not limited thereto.

The Min/Max operators 40 may compare the elements of D1 and the elements of D2 and may output a maximum or a minimum among the elements of each of D1 and D2. The Min/Max operators 40 may determine whether to output the minimum or the maximum among the elements of each of D1 and D2 based on the control vector Vc.

Each of the Min/Max operators 40 may include a subtractor 41 and a multiplexer 43, and thus the Min/Max circuit may include same. The subtractor 41 receives the elements of each of D1 and the elements of D2 and outputs the differences between the elements of D1 and the elements of D2. The multiplexer 43 may be configured to receive an output of the subtractor 41, the control signal vector Vc, the elements of the sequence, and the elements of a copy sequence and output the elements of one of the sequence and the copy sequence. The multiplexer 43 may identify which of the elements of each of D1 and D2 is a maximum or a minimum based on the differences between the elements of D1 and the elements of D2, particularly, based on a least significant bit (LSB) having sign information of the differences between the elements of D1 and the elements of D2. The control vector Vc may be input to the multiplexer 43 as a control signal ctrl, and as a result, one of the elements of D1 and the elements of D2 may be output as a maximum or a minimum.

In a sequence alignment method of a vector processor according to some example embodiments of the present disclosure, elements can be sorted using the permutation circuit of FIG. 7 and the Min/Max circuit of FIG. 8.

Specifically, referring to FIGS. 3A, 7, and 8, for a given sequence [1, 6, 14, 3, 12, 10, 15, 5, 7, 2, 8, 11, 16, 4, 13, 9], the permutation circuit outputs a copy sequence [7, 2, 8, 11, 16, 4, 13, 9, 1, 6, 14, 3, 12, 10, 15, 5].

That is, the input data (I1 through I8) may be the given sequence, and the output data (O1 through O8) may be the copy sequence. The multiplexer selection signal 10 may express a sequence [0, 1, 2, 3, 4, 5, 6, 7, 8, 9, A, B, C, D, E, F] as [8, 9, A, B, C, D, E, F, 0, 1, 2, 3, 4, 5, 6, 7], which means that two groups (i.e., the "1-1" and "1-2" groups G1-1 and G1-2) switch their positions.

The vector register 20 stores the copy sequence and provides the copy sequence to the Min/Max circuit. The Min/Max circuit receives the given sequence as D1 and the copy sequence as D2. Then, the Min/Max operators 40 may compare the zeroth through seventh elements of the "1-1" group G1-1 with the zeroth through seventh elements, respectively, of the "1-2" group G1-2.

In the case of ascending order, the control vector Vc may be [0, 0, 0, 0, 0, 0, 0, 0, 1, 1, 1, 1, 1, 1, 1, 1] where "0" denotes a min value and "1" denotes a max value. In the case of descending order, the control vector Vc may be [1, 1, 1, 1, 1, 1, 1, 1, 0, 0, 0, 0, 0, 0, 0, 0].

Accordingly, min values of "0" are output as the former half of D0, and max values of "1" are output as the latter half of D0. That is, group sorting can be performed simply in two steps through permutation and "minmax" operations. Restated, dividing a sequence into two groups and aligning the respective i-th elements of the groups to generate a new sequence of sorted elements may include generating a copy sequence in a different order from the sequence by using a permutation operation, and performing "minmax" operations on the sequence and the copy sequence. The new sequence of sorted elements may be transmitted as output data. By generating and outputting the new sequence of sorted elements via the operations provided herein, a computing system that includes a vector processor performing such operations may have improved functioning at least by virtue of improved operational efficiency, computer performance, etc.

The "minmax" operations may be performed at the same time (e.g., performed concurrently). Generating a copy sequence in the different order from the sequence by using the permutation operation may include generating the copy sequence by changing the positions of each pair of adjacent groups in the sequence. Portions of the sequence where the "minmax" operations are not performed in the performing "minmax" operations may have common elements with corresponding portions of the copy sequence.

The sequence may include a former half and a latter half having a common size. The performing "minmax" operations on the sequence and the copy sequence may include using a "minmax" operation for choosing a min value and a max value in accordance with a control signal vector. The control signal vector may have different values for the former half of the sequence than for the latter half of the sequence.

Since the Min/Max circuit and the permutation circuit perform a SIMD operation using common arithmetic units such as a multiplexer and a subtractor, the Min/Max circuit and the permutation circuit can be easily implemented using a common vector processor without the need of hardware specialized for sequence alignment. Also, since the Min/Max circuit and the permutation circuit are excellent in terms of complexity, sequence alignment can be highly efficiently performed.

A sequence alignment method of a vector processor according to some example embodiments of the present disclosure will hereinafter be described with reference to FIG. 9. Descriptions of details overlapping with the above description will be omitted or at least simplified.

Figure 9:
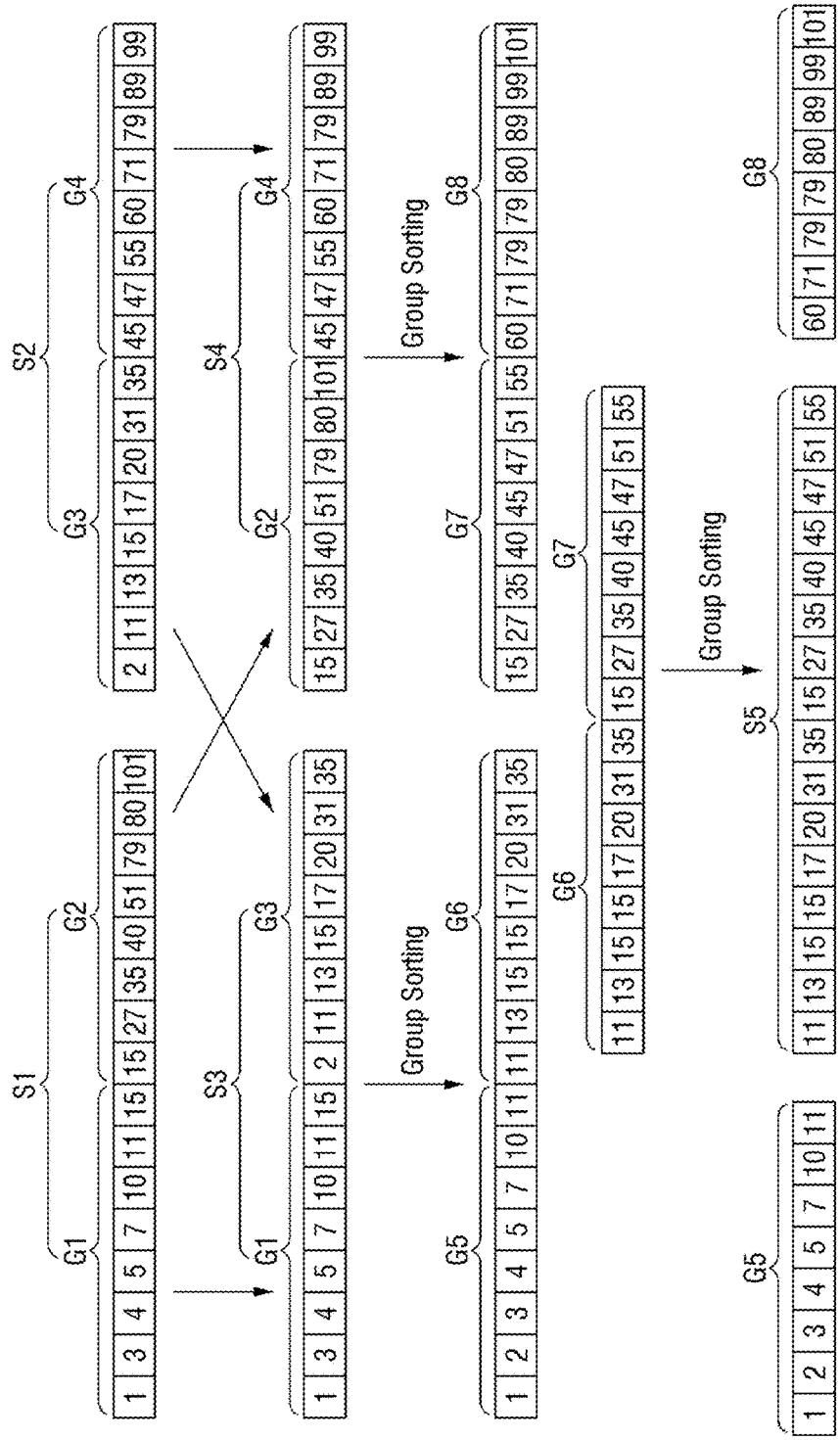
FIG. 9 is a view illustrating a sequence alignment method of a vector processor according to some example embodiments of the present disclosure.

FIG. 9 is a view illustrating a sequence alignment method of a vector processor according to some example embodiments of the present disclosure.

Specifically, FIG. 9 illustrates how to align a sequence having more elements than there are SIMD lanes, particularly, how to align a sequence having 32 elements when there are 16 SIMD lanes.

Referring to FIG. 9, a sequence having 32 elements may be input as two vector data. That is, a sequence (a "loaded sequence") having 32 elements may be input or loaded as two sequences, i.e., first and second sequences S1 and S2 each having 16 elements (e.g., having a common size).

Each of the first and second sequences S1 and S2 may be aligned by the sequence alignment method described above with reference to FIGS. 3A and 3D. In this case, a vector processor according to some example embodiments of the present disclosure may align the first and second sequences S1 and S2 at different slots in parallel in a VLIW mode, but the present disclosure is not limited thereto.

Thereafter, the first sequence S1 may be divided into first and second groups G1 and G2, each having eight elements. The second sequence S2 may be divided into third and fourth groups G3 and G4, each having eight elements.

Thereafter, a third sequence S3, which connects the first and third groups G1 and G3, and a fourth sequence S4, which connects the second and fourth groups G2 and G4, may be formed ("defined"), respectively.

Thereafter, the third and fourth sequences S3 and S4 may be aligned by ("according to") a sequence alignment method of a vector processor according to some example embodiments of the present disclosure. In this case, a vector processor according to some example embodiments of the present disclosure may align the third and fourth sequences S3 and S4 at different slots in parallel in the VLIW mode, such that the vector processor is configured to execute very long instruction word (VLIW) instructions, but the present disclosure is not limited thereto. In some example embodiments, the aligning the third and fourth sequences may include aligning the third and fourth sequences using different functional units of different slots.

The VLIW instructions may include first and second instructions, and the vector processor may be configured to execute the first and second instruction to execute the aligning the third and fourth sequences, respectively. The aligning the third and fourth sequences may include transmitting the first and second instructions to different functional units of different slots, and causing the different functional units of the different slots to align the third and fourth sequences.

The aligned third sequence S3 may include, and may be divided into, fifth and sixth groups G5 and G6, each having eight elements. The aligned fourth sequence S4 may include, and may be divided into, seventh and eighth groups G7 and G8, each having eight elements.

Thereafter, a fifth sequence S5, which connects the sixth and seventh groups G6 and G7, may be formed ("defined").

Thereafter, the fifth sequence S5 may be aligned by a sequence alignment method of a vector processor according to some example embodiments of the present disclosure, such that the loaded sequence can be aligned in an order of the fifth group, the fifth sequence, and the eighth group.

As a result, data having a total of 32 elements can be aligned in the order of the fifth group G5, the fifth sequence S5, and the eighth group G8.

Each of the aligning the fourth sequence and the aligning the fifth sequence may include, for a given sequence of the fourth sequence and the fifth sequence: dividing the given sequence into two halves so as to form a set of groups; aligning k-th elements of the groups, wherein k is a natural number; dividing each group of the set of groups in two halves so as to form sub-groups and aligning l-th elements of the sub-groups, wherein l is a natural number; repeatedly dividing the fourth or fifth sequence and performing sorting thereon on the element-by-element basis until sub-groups each having only one element are obtained; based on a determination that sub-groups each having only one element are obtained, aligning each pair of adjacent sub-groups on the element-by-element basis.

FIG. 10 is a table showing a set of instructions for realizing a sequence alignment method of a vector processor according to some example embodiments of the present disclosure.

A typical vector processor supports a function for processing min and max values, but performs the same operation on all SIMD lanes. That is, an operation of finding a min or max value is performed on all the SIMD lanes. In this case, min and max values can both be found only by performing the operation of finding a min or max value once again, and as a result, additional overhead is incurred.

On the other hand, in some example embodiments of the present disclosure, min and max values can both be processed at the same time using a vector control register that is provided for predication of SIMD lanes (i.e., performing an operation only in a particular lane among the SIMD lanes of a vector processor).

FIG. 10 shows how to realize permutation and "minmax" operations described above with reference to FIGS. 7 and 8.

The alignment of a sequence using the instructions of FIG. 10 and the permutation and Min/Max circuits of FIGS. 7 and 8 will hereinafter be described with reference to FIGS. 11A through 11D.

FIGS. 11A through 11D are views illustrating how to use instructions for realizing a sequence alignment method of a vector processor according to some example embodiments of the present disclosure. Specifically, FIGS. 11A through 11D further illustrate the sequence alignment method described above with reference to FIGS. 3A through 3D along with instructions.

Figure 11A:
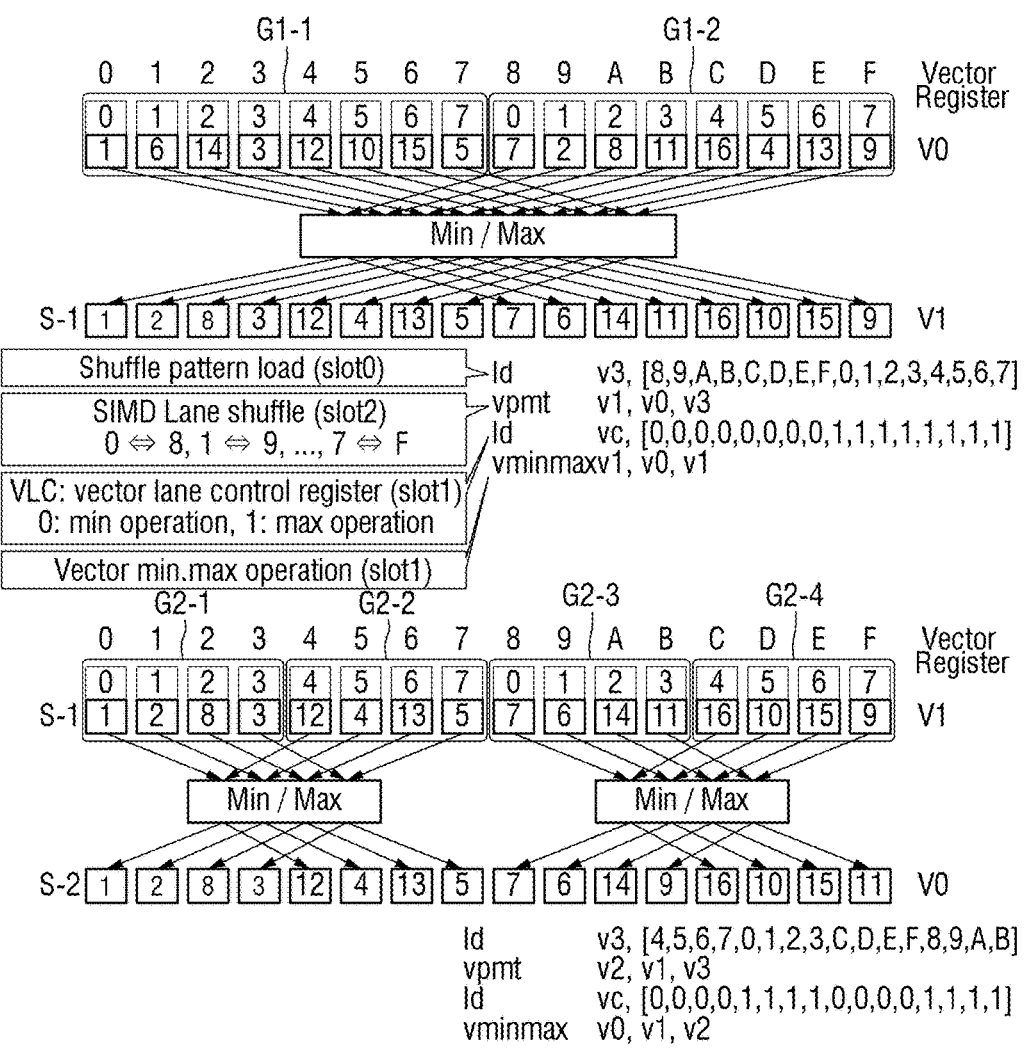
FIG. 11A, FIG. 11B, FIG. 11C, and FIG. 11D are views illustrating how to use the instructions for realizing a sequence alignment method of a vector processor according to some example embodiments of the present disclosure.

Referring to FIG. 11A, first, a vector v3 is loaded using an "ld" instruction. The vector v3 may be the multiplexer selection signal 10 of FIG. 7. That is, the vector v3 may be a selection signal for the first through eighth multiplexers M1 through M8 for performing a permutation operation for changing the positions of two groups.

Thereafter, a copy sequence v1 may be formed using a "vpmt" instruction.

Thereafter, a vector vc may be loaded using the "ld" instruction. The vector vc may be the control vector Vc of the Min/Max operators 40 of FIG. 8. That is, the vector vc may be a vector indicating that the former half of a sequence output as the result of a "minmax" operation consists of min values of "0" and the latter half of the sequence output as the result of a "minmax" operation consists of max values of "1".

Thereafter, the result of group sorting performed in the first stage "Stage1" may be stored in v1 using a "vminmax" instruction.

Thereafter, for four groups, the vector v3 is loaded again (using the "ld" instruction), and the result of permutation performed on the vector v3 is output as v2 (using the "vpmt" instruction). Thereafter, the vector vc may be loaded as "[0, 0, 0, 0, 1, 1, 1, 1, 0, 0, 0, 0, 1, 1, 1, 1]" in order to display the min values thereof in two groups and the max values thereof in two groups. Thereafter, the result of a "minmax" operation may be stored in v1 using the "vminmax" instruction.

Instructions such as "ld", "vpmt", and "vminmax" may be executed by different slots. Since slots share a register together, parallel processing can be realized without incurring memory overhead.

Figure 11B:
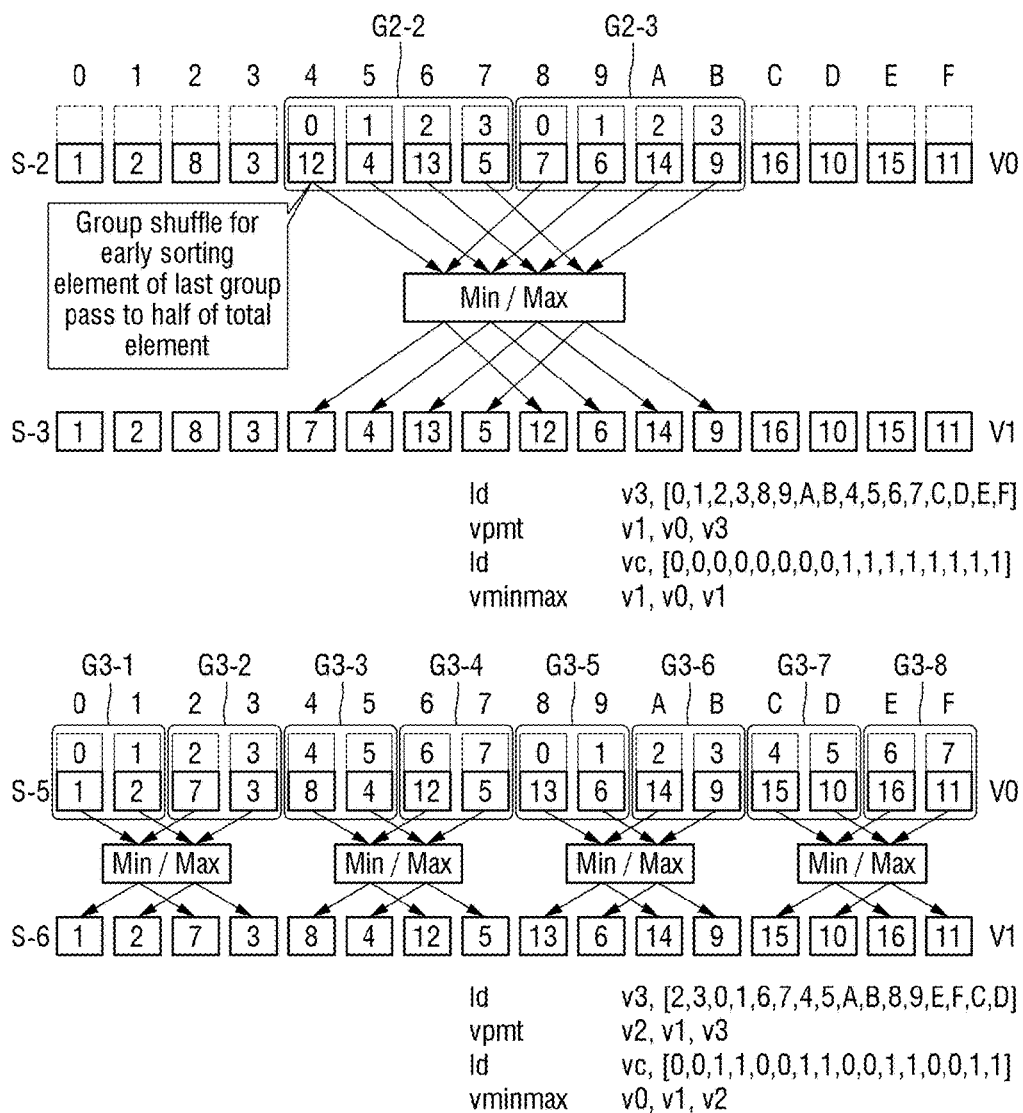

Referring to FIG. 11B, the "ld", "vpmt", and "vminmax" instructions may be executed in a similar manner to that illustrated in FIG. 11A. In a case where the whole sequence except for the first and last groups thereof is aligned, v3, which is for the multiplexer selection signal 10 of FIG. 7, may be loaded as [0, 1, 2, 3, 8, 9, A, B, 4, 5, 6, 7, C, D, E, F] in order not to change elements of the first and last groups of the sequence during a "minmax" operation.

Figure 11C:
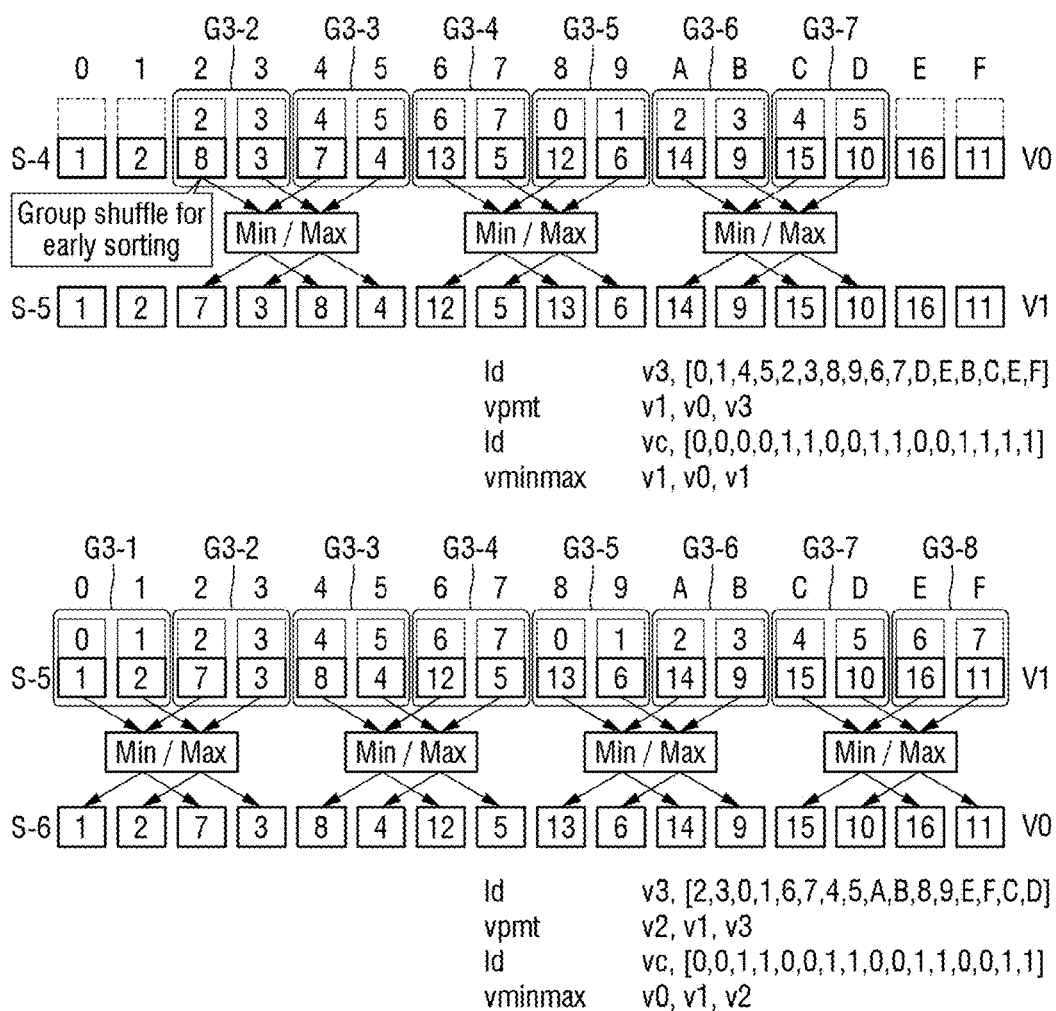
Figure 11D:
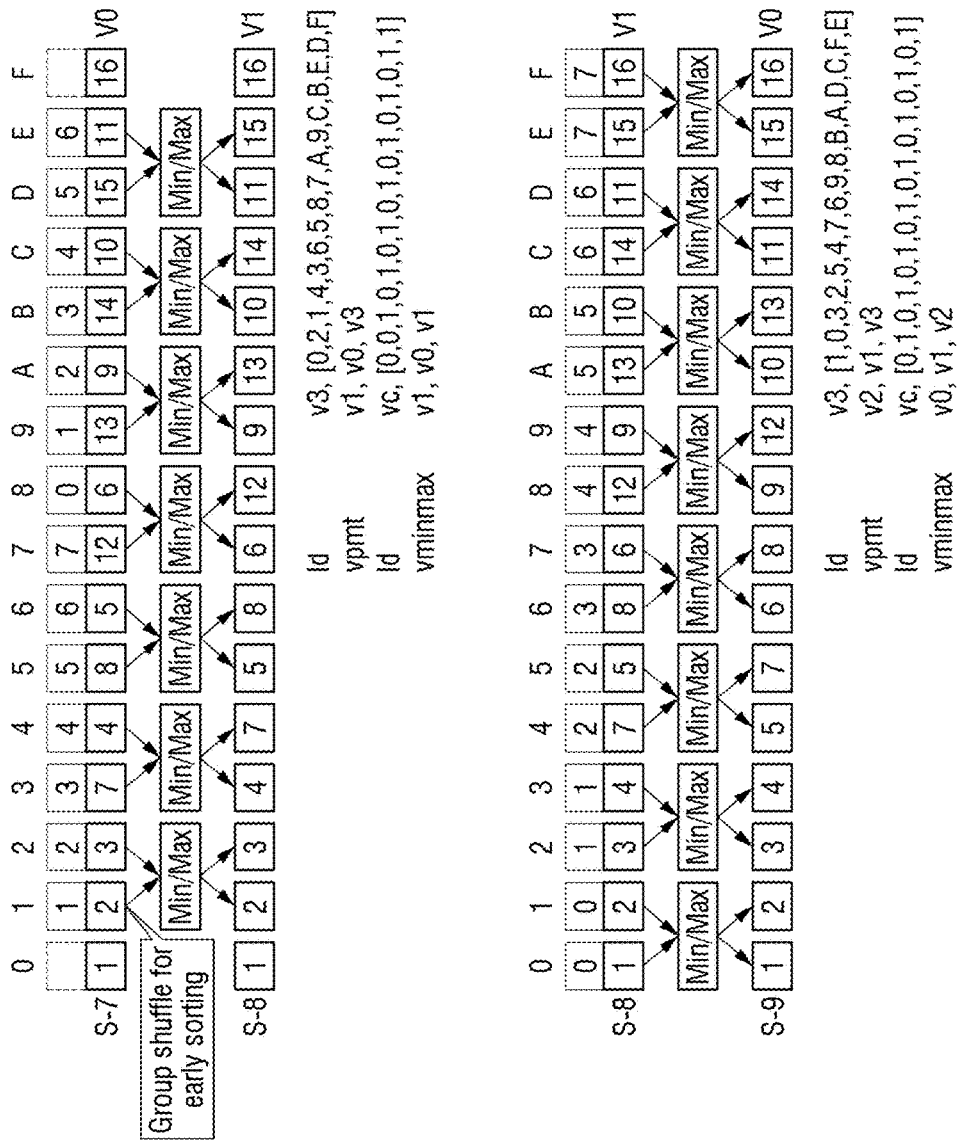

Referring to FIGS. 11C and 11D, the "ld", "vpmt", and "vminmax" instructions may also be executed in another similar manner to that illustrated in FIG. 11A.

While the present inventive concept has been particularly shown and described with reference to example embodiments thereof, it will be understood by those of ordinary skill in the art that various changes in form and details may be made therein without departing from the spirit and scope of the present inventive concept as defined by the following claims. It is therefore desired that the present embodiments be considered in all respects as illustrative and not restrictive, reference being made to the appended claims rather than the foregoing description to indicate the scope of the example embodiments.

What is claimed is:

1. A sequence alignment method of a vector processor, the sequence alignment method comprising:
    loading a sequence, the sequence being an instance of vector data, the instance of vector data including a plurality of elements;
    dividing the sequence into two groups such that each group includes a separate set of i elements of the plurality of elements, i being a natural number;
    aligning respective i-th elements of the groups in the sequence on an element-by-element basis to generate a sequence of sorted elements according to a single instruction multiple data (SIMD) mode;
    iteratively performing an alignment operation based on a determination that each group in the sequence of sorted elements includes more than one element of the plurality of elements, each iteration of the alignment operation including,
        dividing each group into two halves to form two new groups, each new group including a separate set of j elements of the i elements of the divided group, j being a natural number;
        aligning respective j-th elements of each pair of adjacent new groups in the sequence of sorted elements on an element-by-element basis to generate a new sequence of sorted elements, and
        initiating a new iteration of the alignment operation with the new groups and the new sequence of sorted elements, based on a determination that j>1; and
    transmitting the new sequence of a current iteration of the alignment operation as a data output, based on a determination in the current iteration that j=1.

2. The sequence alignment method of claim 1, wherein the plurality of elements includes N elements, and $N=2^n$.

3. The sequence alignment method of claim 2, wherein each iteration of the alignment operation includes
    initiating the new iteration of the alignment operation with the new groups and the new sequence of sorted elements, based on a determination that a quantity of sortings of the respective j-th elements of each pair of adjacent new groups in the sequence of sorted elements on the element-by-element basis is equal to a value of at least 2 m, wherein a quantity of the new groups is equal to $2^{2m}$.

4. The sequence alignment method of claim 3, wherein the aligning in each iteration of the alignment operation includes performing a first alignment operation of aligning each pair of adjacent new groups among all of the new groups on the element-by-element basis;

performing a second alignment operation of aligning each pair of adjacent new groups among all of the new groups except for first and last new groups of the new groups on the element-by-element basis; and repeating the first alignment operation and the second alignment operation m times.

5. The sequence alignment method of claim 1, wherein the loading the sequence includes loading first and second sequences having a common size, dividing the first sequence into first and second groups, dividing the second sequence into third and fourth groups, defining a third sequence, which connects the first and third groups, defining a fourth sequence, which connects the second and fourth groups, aligning the third and fourth sequences, dividing the third sequence into fifth and sixth groups, dividing the fourth sequence into seventh and eighth groups, defining a fifth sequence, which connects the sixth and seventh groups, and aligning the fifth sequence so that the sequence can be aligned in an order of the fifth group, the fifth sequence, and the eighth group, and the aligning the third sequence includes repeatedly dividing the third sequence and performing sorting elements of the divided third sequence on the element-by-element basis.

6. The sequence alignment method of claim 5, wherein the vector processor is configured to implement a plurality of slots that each includes a separate set of functional units, and the aligning the third and fourth sequences includes aligning the third and fourth sequences using different functional units of different slots.

7. The sequence alignment method of claim 6, wherein the vector processor is configured to execute very long instruction word (VLIW) instructions, the VLIW instructions include first and second instructions, the vector processor configured to execute the first and second instruction to execute the aligning the third and fourth sequences, respectively, and the aligning the third and fourth sequences includes transmitting the first and second instructions to different functional units of different slots, and causing the different functional units of the different slots to align the third and fourth sequences.

8. The sequence alignment method of claim 5, wherein each of the aligning the fourth sequence and the aligning the fifth sequence includes, for a given sequence of the fourth sequence and the fifth sequence dividing the given sequence into two halves so as to form a set of groups;

aligning k-th elements of the groups, wherein k is a natural number;

dividing each group of the set of groups in two halves so as to form sub-groups and aligning l-th elements of the sub-groups, wherein l is a natural number;

repeatedly dividing the fourth or fifth sequence and performing sorting thereon on the element-by-element basis until sub-groups each having only one element are obtained; and aligning each pair of adjacent sub-groups on the element-by-element basis, based on a determination that the sub-groups each include only one element.

9. The sequence alignment method of claim 1, wherein the dividing the sequence into two groups and aligning the respective i-th elements of the groups, includes generating a copy sequence in a different order from the sequence by using a permutation operation, and performing "minmax" operations on the sequence and the copy sequence.

10. The sequence alignment method of claim 9, wherein the "minmax" operations are performed concurrently.

* * * * *

UNITED STATES PATENT AND TRADEMARK OFFICE
CERTIFICATE OF CORRECTION

| | | |
|---|---|---|
| PATENT NO. | : 10,372,451 B2 | Page 1 of 1 |
| APPLICATION NO. | : 15/802844 | |
| DATED | : August 6, 2019 | |
| INVENTOR(S) | : Hyun Piu Kim, Hyun Woo Sim and Seong Woo Ahn | |

It is certified that error appears in the above-identified patent and that said Letters Patent is hereby corrected as shown below:

On the Title Page

Item (30) Foreign Application Priority Data should read as follows:
May 25, 2017 (KR) ................ 10-2017-0064502

Signed and Sealed this
Second Day of June, 2020

Andrei Iancu
*Director of the United States Patent and Trademark Office*